(12) United States Patent
Resetco

(10) Patent No.: US 11,453,796 B2
(45) Date of Patent: Sep. 27, 2022

(54) COLOR-CHANGING PARTICULATE COMPOSITIONS FOR ADDITIVE MANUFACTURING AND METHODS ASSOCIATED THEREWITH

(71) Applicant: Xerox Corporation, Norwalk, CT (US)

(72) Inventor: Cristina Resetco, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/082,407

(22) Filed: Oct. 28, 2020

(65) Prior Publication Data

US 2022/0127480 A1    Apr. 28, 2022

(51) Int. Cl.

| | |
|---|---|
| C08F 2/46 | (2006.01) |
| C08F 2/50 | (2006.01) |
| C08G 61/04 | (2006.01) |
| C09D 11/50 | (2014.01) |
| B33Y 70/00 | (2020.01) |
| B33Y 80/00 | (2015.01) |
| B29C 64/153 | (2017.01) |
| C09B 69/10 | (2006.01) |
| C09D 11/037 | (2014.01) |
| C09D 11/101 | (2014.01) |
| C09D 11/102 | (2014.01) |
| C09K 9/02 | (2006.01) |
| B29K 9/00 | (2006.01) |
| B29K 105/00 | (2006.01) |

(52) U.S. Cl.
CPC ............ *C09D 11/50* (2013.01); *B29C 64/153* (2017.08); *B33Y 70/00* (2014.12); *B33Y 80/00* (2014.12); *C09B 69/10* (2013.01); *C09D 11/037* (2013.01); *C09D 11/101* (2013.01); *C09D 11/102* (2013.01); *C09K 9/02* (2013.01); *B29K 2009/00* (2013.01); *B29K 2105/0032* (2013.01)

(58) Field of Classification Search
CPC .............. C08F 2/46; C08F 2/50; C08G 61/04
USPC ................. 522/83, 71, 1, 189, 184, 6; 520/1
See application file for complete search history.

(56) References Cited

U.S. PATENT DOCUMENTS

| | | | |
|---|---|---|---|
| 8,063,164 B2 | 11/2011 | Hays et al. | |
| 9,404,200 B2 | 8/2016 | Steiner et al. | |
| 10,808,081 B2 | 10/2020 | Price | |
| 2008/0286483 A1 | 11/2008 | Khan et al. | |
| 2008/0293095 A1 | 11/2008 | Jelinek | |
| 2009/0191480 A1* | 7/2009 | Rogers ............... | G03C 1/73 430/283.1 |
| 2011/0017961 A1 | 1/2011 | Jarvis | |
| 2013/0292881 A1 | 11/2013 | Steiner et al. | |
| 2017/0037260 A1 | 2/2017 | Northam et al. | |
| 2017/0081538 A1* | 3/2017 | Wu ................ | C09D 11/10 |
| 2017/0225395 A1 | 8/2017 | Boydston et al. | |
| 2018/0134056 A1 | 5/2018 | Van Aert et al. | |
| 2020/0199392 A1 | 6/2020 | Resetco | |
| 2020/0316975 A1 | 10/2020 | Resetco et al. | |

FOREIGN PATENT DOCUMENTS

| | | |
|---|---|---|
| CN | 111171364 A | 5/2020 |
| EP | 3839111 A1 | 6/2021 |
| WO | 2019134902 A1 | 7/2019 |

OTHER PUBLICATIONS

Jelinek, R.M., et al. "Polydiacetylenes-recent molecular advances and applications," RSC Adv., 2013, pp. 21192-21201, 3.
Park, S.I., et al. "A Soluble, Low-Temperature Thermochromic and Chemically Reactive Polydiacetylene," 2013, ACS Appl. Mater. Interfaces, 2013, pp. 8805-8812, 5.
Mergu, N., et al. "Design and synthesis of polydiacetylenes, and their low temperature irreversible thermochromic properties," Dyes and Pigments, https://doi.org/10.1016/j.dyepig.2020.108839.
Extended European Search Report of corresponding EP application No. 21201002.9 dated Mar. 21, 2022.

* cited by examiner

*Primary Examiner* — Jessica Whiteley
(74) *Attorney, Agent, or Firm* — Vorys, Sater, Seymour and Pease LLP

(57) ABSTRACT

Additive manufacturing processes, such as powder bed fusion of thermoplastic particulates, may be employed to form printed objects in a range of shapes. Formation of printed objects having various colors may sometimes be desirable. Thermoplastic particulates incorporating a color-changing material capable of forming different colors under specified activation conditions may impart different colors to a printed object. Such particulate compositions may comprise a plurality of thermoplastic particulates comprising a thermoplastic polymer and a color-changing material associated with the thermoplastic particulates, wherein the color-changing material is photochromic and thermochromic. Conjugated diynes, such as 10,12-pentacosadiynoic acid or a derivative thereof, may be particularly suitable color-changing materials having photochromic and thermochromic properties for forming a range of colors upon a printed object. Nanoparticles, particularly silica nanoparticles, associated with an outer surface of the thermoplastic particulates may enhance the brightness of the color obtained under various activation conditions and afford coloration permanence.

19 Claims, 14 Drawing Sheets

COLOR-CHANGING PARTICULATE COMPOSITIONS FOR ADDITIVE MANUFACTURING AND METHODS ASSOCIATED THEREWITH

FIELD

The present disclosure generally relates to additive manufacturing, and more particularly, additive manufacturing processes employing powder particulates that are color changeable during or after forming a printed object.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts (printed objects) in any number of complex shapes. Additive manufacturing processes operate by layer-by-layer deposition of either 1) a stream of molten printing material or a liquid precursor to a printing material or 2) powder particulates of a printing material. The layer-by-layer deposition usually takes place under control of a computer to deposit and consolidate the printing material in precise locations based upon a digital three-dimensional "blueprint" (a computer-aided design model) of the part being manufactured. In a particular example, consolidation of powder particulates may take place in a powder bed deposited layer-by-layer using a three-dimensional printing system that employs a laser or electron beam to heat precise locations of the powder bed, thereby consolidating specified powder particulates to form a part having a desired shape. Fusion of powder particulates in a powder bed may take place by selective laser sintering (SLS), which employs a laser to promote consolidation of powder particulates via localized heating.

Among the powder particulates usable in three-dimensional printing are those comprising thermoplastic polymers. Although a wide array of thermoplastic polymers are known, there are relatively few having properties compatible for use in current three-dimensional printing techniques, particularly when performing particulate consolidation by selective laser sintering. Thermoplastic polymers suitable for consolidation by selective laser sintering include those having a significant difference between the onset of melting and the onset of crystallization, which may promote good structural and mechanical integrity.

As additive manufacturing has become more widely employed for producing printed objects of various types, access to printed objects having a range of colors has become desirable in many instances. While a colorant sometimes may be successfully incorporated within powder particulates compatible for use in additive manufacturing processes, this approach necessitates stockpiling multiple types of powder particulates suitable for producing a desired range of colors. In addition to higher costs and inventory management issues, this approach may require loading a three-dimensional printing system with different types of powder particulates at specified times to produce printed objects of a particular color. For printed objects having multiple colors, the issue of supplying colored powder particulates to the three-dimensional printing system may be even more complicated.

SUMMARY

The present disclosure provides particulate compositions suitable for additive manufacturing. The particulate compositions comprise: a plurality of thermoplastic particulates comprising a thermoplastic polymer, and a color-changing material associated with the thermoplastic particulates, the color-changing material being both photochromic and thermochromic.

The present disclosure also provides printed objects formed using the particulate compositions. The printed objects comprise: a polymer matrix comprising a thermoplastic polymer, and a color-changing material associated with the polymer matrix, the color-changing material being both photochromic and thermochromic.

The present disclosure also provides methods for forming printed objects by additive manufacturing. The methods comprise: providing a particulate composition comprising a plurality of thermoplastic particulates comprising a thermoplastic polymer, and a color-changing material associated with the thermoplastic particulates, the color-changing material being both photochromic and thermochromic; and forming a printed object having a polymer matrix comprising the thermoplastic polymer and the color-changing material associated with the polymer matrix.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
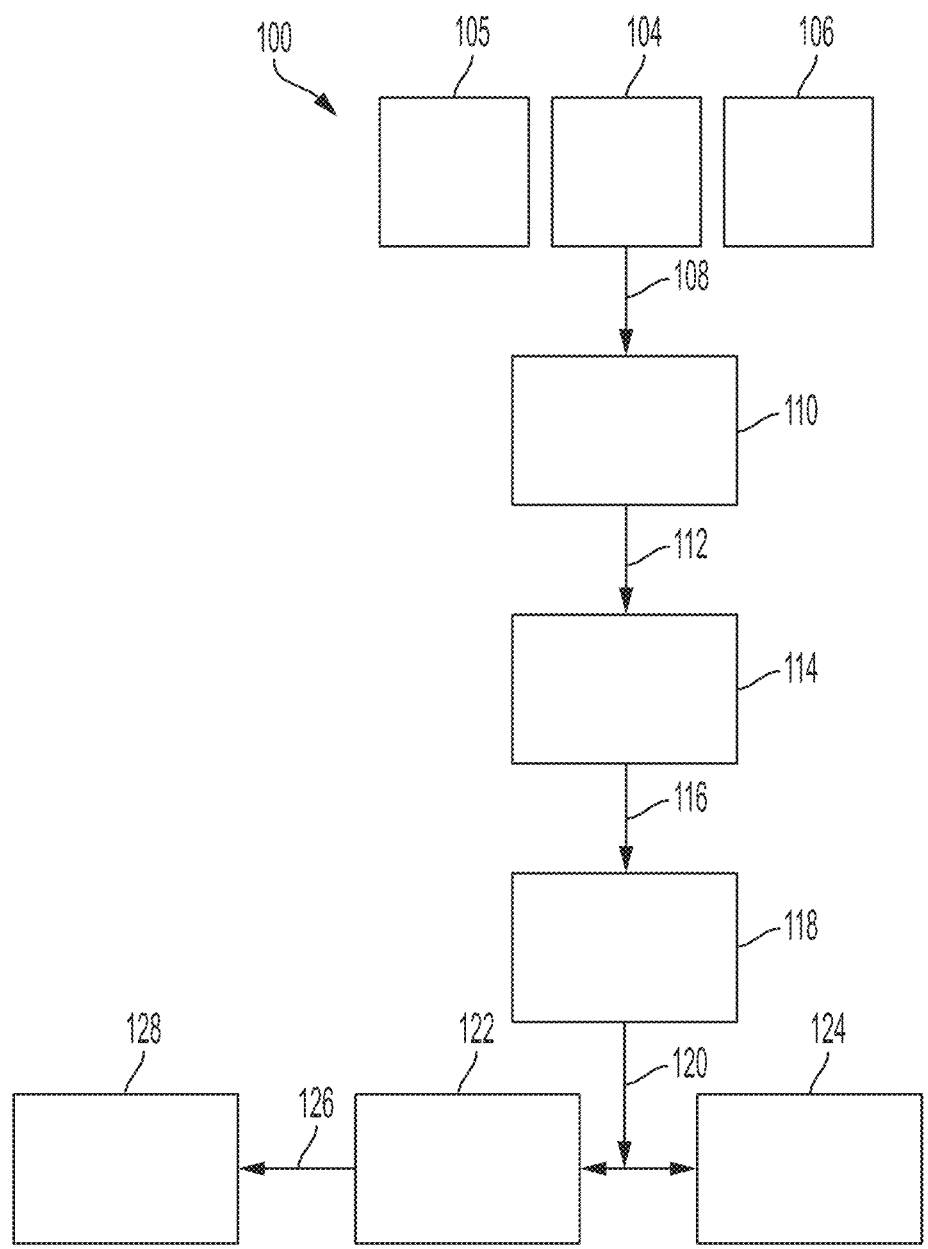
FIG. 1 is a flow chart of anon-limiting example method for producing thermoplastic particulates in accordance with the present disclosure.

The present disclosure generally relates to additive manufacturing, and more particularly, additive manufacturing processes employing powder particulates that are color changeable during or after forming a printed object.

As discussed above, printed objects may be formed in a variety of complex shapes through sintering of powder particulates (e.g., through selective laser sintering and other powder bed fusion processes). In some instances, it may be desirable to form printed objects having the same shape but in different colors and/or having multiple colors within a single printed object. At present, both approaches necessitate stockpiling multiple types of powder particulates bearing a specified colorant, which may be costly and operationally complicated in terms of inventory management and supplying suitable powder particulates to a three-dimensional printing system at a particular time.

The present disclosure demonstrates that color-changing materials may be successfully incorporated within powder particulates, particularly color-changing materials that are both photochromic and thermochromic. As used herein, the term "photochromic" refers to a substance that undergoes a color change in the presence of a specified type of electromagnetic radiation, and the term "thermochromic" refers to a substance that undergoes a color change under thermal activation at a specified temperature. Advantageously, such color-changing materials may be incorporated within powder particulates following particulate synthesis by a suitable technique, thereby allowing unmodified particulates to be stockpiled and loaded with a color-changing material as needed. Particular color-changing materials may be incorporated within powder particulates in response to specific coloration needs. Color-changing materials that are both photochromic and thermochromic are discussed in further detail below.

Advantageous powder particulates may be formed through melt emulsification of a thermoplastic polymer in a high-boiling inert solvent, particularly in the presence of nanoparticles. U.S. patent application Ser. No. 16/946,622, filed on Jun. 30, 2020 and incorporated herein by reference, provides powder particulates formed by melt emulsification of a thermoplastic polymer in the presence of nanoparticles, particularly silica nanoparticles or other oxide nanoparticles, which may be especially advantageous in terms of their narrow particle size distribution, ready sinterability, and good powder flow performance. Additional details directed to melt emulsification preparation of powder particulates in the presence of nanoparticles is provided hereinbelow.

Surprisingly, a color-changing material may be incorporated upon powder particulates formed by melt emulsification without compromising the foregoing desirable properties. In particular, one or more conjugated diynes (also referred to herein as diacetylenes) may be incorporated upon powder particulates comprising a thermoplastic polymer through solution-based treatment of the powder particulates following their synthesis by melt emulsification. Many diynes have characteristic photochromic and thermochromic properties and may be suitable for use in the disclosure herein, particularly diyne carboxylic acids. One particularly advantageous diyne carboxylic acid suitable for use in the disclosure herein is 10,12-pentacosadiynoic acid (Formula 1),

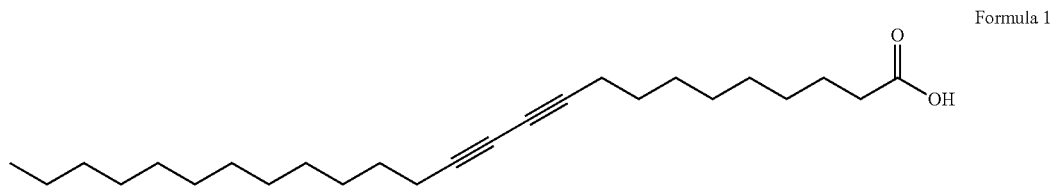 [SMILES: CCCCCCCCCCCCC#CC#CCCCCCCCCC(=O)O]

Formula 1 which upon photoirradiation and/or thermal activation may afford a blue, red, or yellow coloration to a printed object. Advantageously, these primary colors may be blended to produce a variety of secondary colors (e.g., orange, purple and green). As such, the present disclosure provides access to a much wider array of colors than those directly obtainable by photoirradiation or thermal activation as provided herein.

Diynes are usually colorless (clear or white) prior to undergoing activation, either by photoirradiation, heating, or exposure to actinic radiation. Without being bound by theory, photoactivation conditions for diynes are believed to result in formation of a polymerized reaction product that is a diacetylene polymer having a conjugated ene-yne backbone. Formula 2 shows a structure of a diacetylene polymer believed to result from activation of 10,12-pentacosadiynoic acid (Formula 1) under photoirradiation conditions.

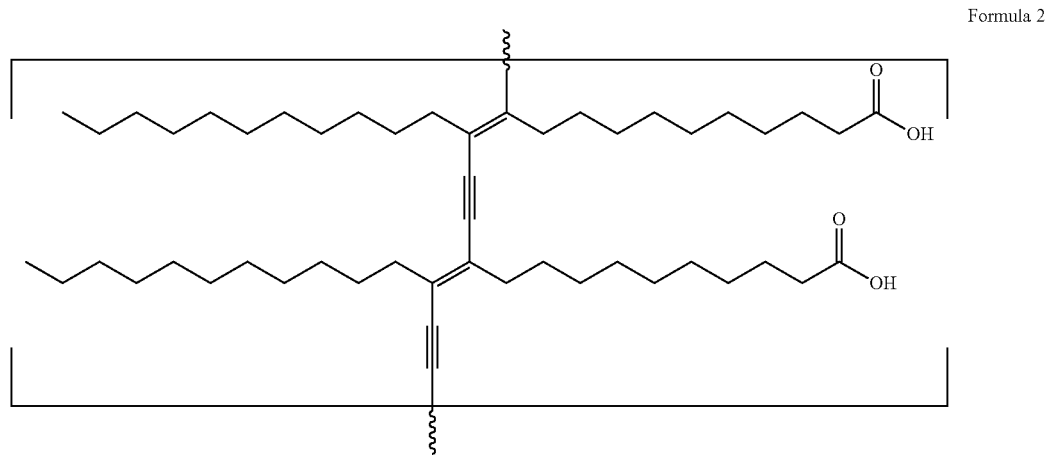

Formula 2

Advantageously, the activation conditions for producing coloration from conjugated diynes either already occurs during powder bed fusion and similar particulate consolidation processes or is readily incorporated in such processes. Alternately, a printed object containing a conjugated diyne within a thermoplastic polymer matrix may be readily converted between various coloration states through exposing at least a portion of the printed object to appropriate activation conditions. As such, conjugated diynes may be particularly advantageous and compatible for incorporation in additive manufacturing processes.

Although the color-changing performance of conjugated diynes under suitable activation conditions is known, the present disclosure demonstrates that unexpected performance may occur when the conjugated diynes are incorporated upon the surface of thermoplastic particulates containing silica nanoparticles. In particular, the intensity of the color change may be much more pronounced when activating the conjugated diyne in the presence of silica nanoparticles. Some tunability of the coloration and the color intensity may also be realized by changing the functionalization, loading, and/or size of the silica nanoparticles. Different surfactants may also impact the intensity of the color change. In addition, the conjugated diyne coloration obtained under various activation conditions appears to be permanent in the presence of silica nanoparticles, whereas the coloration change for some diynes may fade once the activation conditions are removed in the absence of silica nanoparticles.

Terms used in the description and claims herein have their plain and ordinary meaning, except as modified by the paragraphs below.

As used herein, the term "color-changing material" refers to one or more monomers that form a colored polymer upon undergoing polymerization under specified conditions, and/or a polymer that undergoes a color change from a first coloration state to one or more second coloration states after exposure to specified conditions. The term "color" and grammatical forms thereof refer to any hue that does not appear colorless or white when viewed by the human eye.

As used herein, the term "immiscible" refers to a mixture of components that, when combined, form two or more phases that have less than 5 wt. % solubility in each other at ambient pressure and at room temperature or at the melting point of a component if the component is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "thermoplastic polymer" refers to a polymer material that softens and hardens reversibly on heating and cooling. Thermoplastic polymers encompass thermoplastic elastomers.

As used herein, the term "nanoparticles" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the term "associated" refers to chemical bonding, physical admixture of two or more substances, physical adherence of a substance to a surface, or any combination thereof, particularly wherein the substance is an emulsion stabilizer comprising nanoparticles. Without being limited by theory, it is believed that the associations described herein between polymers and emulsion stabilizers are primarily physical adherence via hydrogen bonding and/or other mechanisms. However, chemical bonding may be occurring to some degree. Similarly, a color-changing material may associate with another substance by one or more of the foregoing mechanisms.

As used herein, the term "admixed" refers to dissolution of a first substance in a second substance or dispersion of a first substance as a solid in a second substance, wherein the dispersion may be uniform or non-uniform.

As used herein, the term "D10" refers to a diameter at which 10% of a sample (on a volume basis unless otherwise specified) is comprised of particles having a diameter less than said diameter value. As used herein, the term "D50" refers to a diameter at which 50% of a sample (on a volume basis unless otherwise specified) is comprised of particles having a diameter less than said diameter value. D50 may also be referred to as the "average particle size." As used herein, the term "D90" refers to a diameter at which 90% of a sample (on a volume basis unless otherwise specified) is comprised of particles having a diameter less than said diameter value.

As used herein, the term "shear" refers to stirring or a similar process that induces mechanical agitation in a fluid.

As used herein, the term "embed," with respect to nanoparticles and a surface of a polymer particle, refers to the nanoparticles being at least partially extended into the surface such that polymer is in contact with the nanoparticles to a greater degree than would occur if the nanoparticles were simply laid on the surface of the polymer particle, thereby contacting the surface tangentially.

As used herein, the viscosity of carrier fluids refer to the kinematic viscosity at 25° C., unless otherwise specified, and are measured per ASTM D445-19, unless otherwise specified.

The melting point of a thermoplastic polymer, unless otherwise specified, is determined by ASTM E794-06(2018) with 10° C./min ramping and cooling rates.

The softening temperature or softening point of a thermoplastic polymer, unless otherwise specified, is determined by ASTM D6090-17. The softening temperature can be measured by using a cup and ball apparatus available from Mettler-Toledo using a 0.50 gram sample with a heating rate of 1° C./min.

As used herein, the term "derivative" refers to a compound made directly or indirectly from another compound, typically in not more than two synthetic steps.

Particulate compositions of the present disclosure may comprise a plurality of thermoplastic particulates comprising a thermoplastic polymer, and a color-changing material associated with the thermoplastic particulates, wherein the color-changing material is both photochromic and thermochromic. In more particular examples, the color-changing material may comprise one or more conjugated diynes, as described in further detail hereinafter. The particulate compositions disclosed herein may be suitable for use in additive manufacturing processes, particularly additive manufacturing processes employing selective laser sintering and other powder bed fusion processes used to promote particulate consolidation. Particulate compositions suitable for additive manufacturing may exhibit good flow performance for dispensation in a powder bed using a print head or similar device. Flow aids and modifications upon the thermoplastic particulates may facilitate the dispensation process. Suitable thermoplastic particulates may also exhibit melting and crystallization temperatures compatible with a specified consolidation technique in a given additive manufacturing process.

More specific particulate compositions of the present disclosure suitable for additive manufacturing may comprise a plurality of particulates comprising a thermoplastic polymer, a plurality of nanoparticles disposed upon an outer surface of each of the plurality of thermoplastic particulates, and a color-changing material associated with the thermoplastic particulates. The color-changing material may be both photochromic and thermochromic, particularly one or more conjugated diynes, more particularly one or more conjugated diyne carboxylic acids or a derivative thereof. Optionally, at least some nanoparticles may be admixed with the thermoplastic polymer, such that a first portion of the nanoparticles are located within the thermoplastic particulates and a second portion of the nanoparticles are disposed upon the outer surface of the thermoplastic particulates. The nanoparticles disposed upon the outer surface of the thermoplastic particulates may be at least partially embedded in the outer surface and associated therewith. When present, nanoparticles disposed upon the outer surface of the thermoplastic particulates may promote ready dispensation of the particulate compositions during additive manufacturing.

In some examples, the plurality of nanoparticles may comprise a plurality of oxide nanoparticles. Oxide nanoparticles suitable for use in the present disclosure may include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide" and may be suitably used in the disclosure herein. The oxide nanoparticles may be hydrophilic or hydrophobic in nature, which may be a native property of the nanoparticles or result from surface treatment of the nanoparticles. For example, silica nanoparticles having a hydrophobic surface treatment, such as dimethylsilyl, trimethylsilyl, or the like, may be formed through reacting hydrophilic surface hydroxyl groups with an appropriate functionalizing agent. Hydrophobically modified oxide nanoparticles may be particularly desirable in the methods and particulate compositions of the present disclosure, although unmodified (unfunctionalized) oxide nanoparticles or hydrophilically modified oxide nanoparticles may also be suitable for use as well.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being varied. Hydrophilic fumed silica nanoparticles may also be suitably used in the disclosure herein. Silazane and silane hydrophobic functionalizations are among the hydrophobic functionalizations that may be used in the present disclosure. As such, the plurality of oxide nanoparticles used in the disclosure herein may comprise or consist essentially of silica nanoparticles, particularly silica nanoparticles that are hydrophobically modified or hydrophilically modified. Either type of conjugated diynes may suitably interact with conjugated diynes to afford the effects described herein. Silica nanoparticles may be used in combination with another type of oxide nanoparticle or non-oxide nanoparticle, wherein the other type of oxide or non-oxide nanoparticle may convey properties to the thermoplastic particulates, or a printed object formed therefrom, that are not attained when using silica nanoparticles alone.

Carbon black is another type of nanoparticle that may be present upon thermoplastic particulates in the disclosure herein. Various grades of carbon black will be familiar to one having ordinary skill in the art, any of which may be used in the disclosure herein. Other nanoparticles capable of absorbing infrared radiation may be used similarly to facilitate thermoplastic particulate formation as well. Carbon black, silica, and other types of oxide nanoparticles may be present in combination with one another in some instances. If carbon black is included upon the thermoplastic particulates, the loading may be kept sufficiently small to allow the above-described color changes to be observed.

Polymer nanoparticles are another type of nanoparticle that may be present upon thermoplastic particulates in the disclosure herein. Suitable polymer nanoparticles may include one or more polymers that are thermosetting and/or crosslinked, such that they do not melt when processed by melt emulsification or similar particulate formation techniques according to the disclosure herein. Nanoparticles comprising high molecular weight thermoplastic polymers having high melting or decomposition points may similarly be suitable for facilitating particulate formation from a lower melting thermoplastic polymer.

The loading and particle size of silica nanoparticles or similar oxide nanoparticles upon thermoplastic particulates may vary over a wide range in the disclosure herein. The loading of the silica nanoparticles or similar oxide nanoparticles may be determined by the nanoparticle concentration in a carrier fluid used to promote formation of the thermoplastic particulates by melt emulsification, as described further below. Up to about 50 wt. % nanoparticles relative to the thermoplastic polymer may be present, such as up to about 25 wt. %, or up to about 10 wt. %. In non-limiting examples, the concentration of nanoparticles in the carrier fluid may range from about 0.01 wt. % to about 10 wt. %, or about 0.05 wt. % to about 10 wt. %, or about 0.05 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. % with respect to the weight of the thermoplastic polymer. The particle size of the nanoparticles may range from about 1 nm to about 100 nm, although nanoparticle sizes up to about 500 nm may also be acceptable. In non-limiting examples, the particle size of the nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. The nanoparticles, particularly silica nanoparticles and similar oxide nanoparticles, may have a BET surface area of about 10 $m^2$/g to about 500 $m^2$/g, or about 10 $m^2$/g to about 150 $m^2$/g, or about 25 $m^2$/g to about 100 $m^2$/g, or about 100 $m^2$/g to about 250 $m^2$/g, or about 250 $m^2$/g to about 500 $m^2$/g.

Particular silica nanoparticles suitable for use in the disclosure herein may be hydrophobically modified. Hydrophobic functionalization may improve dispersion of the silica nanoparticles in a melt emulsification carrier fluid, which may be highly hydrophobic. The hydrophobic functionalization may be non-covalently or covalently attached to a surface of the silica nanoparticles. Covalent attachment may take place, for example, through functionalization of surface hydroxyl groups of the silica nanoparticles. In a non-limiting example, silica nanoparticles may be treated with dichlorodimethylsilane or hexamethyldisilazane to afford covalent attachment of a hydrophobic modification.

Commercially available hydrophobically functionalized silica nanoparticles include, for example, AEROSIL RX50 (Evonik, average particle size=40 nm, 25-45 $m^2$/g BET surface area), AEROSIL R812S (Evonik, average particle size=7 nm, 195-245 $m^2$/g BET surface area), and AEROSIL R972 (Evonik, average particle size=16 nm, 90-130 $m^2$/g BET surface area).

Suitable conjugated diynes that may be incorporated as a color-changing material in the disclosure herein are not considered to be especially limited. Illustrative conjugated diynes suitable for use in the disclosure herein include those described in, for example, U.S. Pat. No. 8,063,164 and U.S. Patent Application Publications 2008/0293095 and 2020/0199392, each of which is incorporated herein by reference in its entirety. Conjugated diyne carboxylic acids or derivatives thereof may be particularly suitable, since long-chain conjugated diyne carboxylic acids are amphiphilic and may organize in micelles. Indeed, preorganization of conjugated diyne carboxylic acids in micelles is usually needed to promote effective polymerization of these molecules. Surprisingly, preorganization of conjugated diynes upon thermoplastic particulates according to the disclosure herein may also be effective to promote a color-changing polymerization reaction of these types of molecules, including those lacking a carboxylic acid head group in some instances. Examples of long-chain conjugated diyne carboxylic acids suitable for use in the disclosure herein may have a structure represented by Formula 3

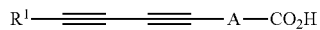

Formula 3 wherein $R^1$ is a $C_4$-$C_{20}$ alkyl group with optional branching or heteroatom substitution and A is a $C_4$-$C_{20}$ alkylene group with optional branching or heteroatom substitution. Preferably, $R^1$ and A are straight chain alkyl or alkylene groups, respectively. In particular examples, $R^1$ is a straight-chain $C_4$-$C_{16}$ alkyl group or a straight-chain $C_6$-$C_{12}$ alkyl group and A is a straight-chain $C_4$-$C_{16}$ alkylene group or a straight-chain $C_6$-$C_{12}$ alkylene group. In particular examples, $R^1$ and A may collectively contain about 12 carbon atoms to about 36 carbon atoms, or about 16 carbon atoms to about 28 carbon atoms, or about 18 carbon atoms to about 26 carbon atoms. Particular examples of conjugated diyne carboxylic acids suitable for incorporation upon thermoplastic particulates of the present disclosure include, for example, 10,12-pentacosadiynoic acid, 4,6-dodecadiynoic acid, 10,12-docosadiynedioic acid, 5,7-eicosadiynoic acid, 10-12-heneicosadiynoic acid, 10-12-heptacosadiynoic acid, 5,7- octadecadiynoic acid, 6,8-nonadecadiynoic acid, 5,7-tetradecadiynoic acid, 10-12-tricosadiynoic acid, and any combination thereof.

Derivative forms of conjugated diyne carboxylic acids may also be suitable for use in the disclosure herein. Suitable derivative forms of conjugated diyne carboxylic acids may include, for example, esters and amides having structures represented by Formulas 4 and 5 below, respectively. Salt forms of the carboxylic acids may also be suitable derivative forms of conjugated

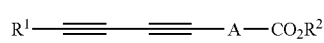

Formula 4

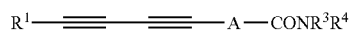

Formula 5 diyne carboxylic acids as well. Esters may serve as suitable precursors for conjugated diyne carboxylic acids in some instances. In Formula 4 $R^2$ is a $C_1$-$C_{24}$ alkyl group with optional branching or heteroatom substitution, preferably a $C_1$-$C_{10}$ straight-chain or branched alkyl group. In Formula 5, $R^3$ and $R^4$ are independently selected from H and a $C_1$-$C_{24}$ alkyl group with optional branching or heteroatom substitution, preferably H or a $C_1$-$C_{10}$ straight-chain or branched alkyl group. A particular derivative form may be selected to afford a specified coloration following activation of the conjugated diyne and/or to improve compatibility when incorporating the conjugated diyne upon the thermoplastic particulates. Other diynes that are not carboxylic acid derivatives may also exhibit color-changing properties and may also be suitable for use in the disclosure herein.

Salt form derivatives of conjugated diyne carboxylic acids may similarly be employed to promote a specified coloration upon activation. Transition metal salts, for example, may attenuate or change the color formed upon activation of the conjugated diyne. A particular salt form derivative may also be selected to promote solubility or compatibility in a given solvent when incorporating a conjugated diyne upon thermoplastic particulates, for example. Suitable salt forms of diyne carboxylic acids for use in the disclosure herein may include monovalent metal salts, such as alkali metal salts; divalent metal salts such as alkaline earth metal salts; trivalent metal salts, such as aluminum salts; and transition metal salts (e.g., Zn salts).

Alternative color-changing materials may be utilized in place of or in combination with conjugated diyne carboxylic acids. Suitable alternative thermochromic substances may include, for example, bis(2-amino-4-oxo-6-methylpyrimidinium)-tetrachlorocuprate(II); bis(2-amino-4-chloro-6-methylpyrimidinium) hexachlorodicuprate(II); cobalt chloride; 3,5-dinitro salicylic acid; leuco dyes; spiropyrenes, bis(2-amino-4-oxo-6-methylpyrimidinium)tetrachlorocuprate(II) and bis(2-amino-4-chloro-6-methylpyrimidinium) hexachlorodicuprate(II), benzo- and naphthopyrans (chromenes), poly(xylylviologen) dibromide, di-beta-naphthospiropyran, ferrocene-modified bis(spiropyridopyran), isomers of 1-isopropylidene-2-[1-(2-methyl-5-phenyl-3-thienyl)ethylidene]-succinic anhydride, infrared dyes, spirobenzopyrans, spironapthooxazines, spirothopyran and related compounds, leucoquinone dyes, natural leucoquinone, traditional leucoquinone, synthetic quinones, thiazine leuco dyes, acylated leuco thiazine dyes, nonacylated leuco thiazine dyes, oxazine leuco dyes, acylated oxazine dyes, nonacylated oxazine leuco dyes, catalytic dyes, combinations with dye developers, arylmethane phthalides, diarylmethane phthalides, monoarylmethane phthalides, monoheterocyclic substituted phthalides, 3-heterocyclic substituted phthalides, diarylmethylazaphthalides, bisheterocyclic substituted phthalides, 3,3-bisheterocyclic substituted phthalides, 3-heterocyclic substituted azaphthalides, 3,3-bisheterocyclic substituted azaphthalides, alkenyl substituted phthalides, 3-ethylenyl phthalides, 3,3-bisethylenyl phthalides, 3-butadienyl phthalides, bridged phthalides, spirofluorene phthalides, spirobensanthracene phthalides, bisphthalides, di and triarylmethanes, diphenylmethanes, carbinol bases, fluoran compounds, reaction products of keto acids and phenols, reaction products of keto acids and 4-alkoxydiphenylamines, reaction products of keto acids and 3-alkoxdiphenylamines, reaction products of 2'-aminofluorans and aralkyl halides, reaction products of 3'-chlorofluorans and amines, tetrazolium salts, tetrazolium salts from formazans, tetrazolium salts from tetrazoles, and the like.

Other color-changing materials of interest may include, for example, leucodyes, vinylphenylmethane-leucocyanides and derivatives, fluoran dyes and derivatives, thermochromic pigments, micro-pigments and nano-pigments, molybdenum compounds, doped or undoped vanadium dioxide, indolinospirochromenes, melting waxes, encapsulated dyes, liquid crystalline materials, cholesteric liquid crystalline materials, spiropyrans, polybithiophenes, bipyridine materials, mercury chloride dyes, tin complexes, heat formable materials which change structure based on temperature, natural thermochromic materials such as pigments in beans, $[Cu(dieten)_2](BF_4)_2$ (dieten=N,N-diethylethylenediamine), various thermochromic inks sold by Securink Corp. (Springfield, Va.), Matusui Corp., Liquid Crystal Research Crop., or any acceptable thermochromic materials with the capacity to report a temperature change or can be photo-stimulated and the like.

Loading of the color-changing material upon the thermoplastic particulates may vary over a wide range. Depending on the intensity of the coloration sought, the loading of the color-changing material may be up to about 50 wt. % relative to the thermoplastic particulates before incorporating the color-changing material thereon. In particular examples, the loading of the color-changing material upon the thermoplastic particulates may range from about 0.1 wt. % to about 50 wt. % relative to the thermoplastic polymer, or about 0.5 wt. % to about 25 wt. % relative to the thermoplastic polymer, or about 1 wt. % to about 15 wt. % relative to the thermoplastic polymer, or about 2 wt. % to about 10 wt. % relative to the thermoplastic polymer, or about 5 wt. % to about 25 wt. % relative to the thermoplastic polymer.

Examples of thermoplastic polymers suitable for use in the disclosure herein include, but are not limited to, polyamides (e.g., Nylon-6, Nylon-12, and the like), polyurethanes, polyethylenes, polypropylenes, polyacetals, polycarbonates, polyethylene terephthalates, polybutylene terephthalates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyaryl ether ketones (PAEK), polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the present disclosure.

Particularly suitable examples of thermoplastic polymers for use in the disclosure herein may include polyamides, such as Nylon 6 or Nylon 12; acrylonitrile butadiene styrene; polylactic acid; polyurethanes; poly(arylene ether)s; polyaryletherketones; polycarbonates; polyimides; polyphenylene sulfides; poly(arylene sulfone)s; polyesters, such as polyethylene terephthalate or polybutylene terephthalate; copolymers comprising a polyether block and a polyamide block (PEBA or polyether block amide); and any combination thereof.

More specific examples of suitable polyamides include, but are not limited to, polycaproamide (Nylon 6, polyamide 6, or PA6), poly(hexamethylene succinamide) (Nylon 46, polyamide 46, or PA46), polyhexamethylene adipamide (Nylon 66, polyamide 66, or PA66), polypentamethylene adipamide (Nylon 56, polyamide 56, or PA56), polyhexamethylene sebacamide (Nylon 610, polyamide 610, or PA610), polyundecaamide (Nylon 11, polyamide 11, or PA11), polydodecaamide (Nylon 12, polyamide 12, or PA12), and polyhexamethylene terephthalamide (Nylon 6T, polyamide 6T, or PA6T), Nylon 10.10 (polyamide 10.10 or PA10.10), Nylon 10.12 (polyamide 10.12 or PA10.12), Nylon 10.14 (polyamide 10.14 or PA10.14), Nylon 10.18 (polyamide 10.18 or PA10.18), Nylon 6.10 (polyamide 6.10 or PA6.10), Nylon 6.18 (polyamide 6.18 or PA6.18), Nylon 6.12 (polyamide 6.12 or PA6.12), Nylon 6.14 (polyamide 6.14 or PA6.14), semi-aromatic polyamide, and the like, and any combination thereof. Copolyamides may also be used. Examples of suitable copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Polyesteramides, polyetheresteramides, polycarbonate-esteramides, and polyether block amides, which may be elastomeric, may also be used.

Examples of suitable polyurethanes include, but are not limited to, polyether polyurethanes, polyester polyurethanes, mixed polyether and polyester polyurethanes, the like, and any combination thereof. Examples of suitable polyurethanes include, but are not limited to, poly [4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Suitable thermoplastic polymers may be elastomeric or non-elastomeric. Some of the foregoing examples of thermoplastic polymers may be elastomeric or non-elastomeric depending on the specific composition of the polymer. For example, polyethylene that is a copolymer of ethylene and propylene may be elastomeric or not depending on the amount of propylene present in the polymer.

Elastomeric thermoplastic polymers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide), any of which may be used in the disclosure herein. Examples of elastomeric thermoplastic polymers can be found in Handbook of Thermoplastic Elastomers, 2nd ed., B. M. Walker and C. P. Rader, eds., Van Nostrand Reinhold, New York, 1988. Examples of elastomeric thermoplastic polymers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of isoprene, isobutylene, butylene, ethylene/butylene, ethylene-propylene, and ethylene-ethylene/propylene. More specific elastomeric styrenic block copolymer examples include, but are not limited to, poly (styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

In non-limiting examples, thermoplastic particulates of the disclosure herein may be formed through melt emulsification. Such methods for producing thermoplastic particulates may comprise combining a thermoplastic polymer in a carrier fluid at a heating temperature at or above a melting point or softening temperature of the thermoplastic polymer, wherein the thermoplastic polymer and the carrier fluid are substantially immiscible at the heating temperature; applying sufficient shear to disperse the thermoplastic polymer as liquefied droplets in the carrier fluid at the heating temperature; after liquefied droplets have formed, cooling the carrier fluid to at least a temperature at which thermoplastic particulates in a solidified state form, the thermoplastic particulates comprising the thermoplastic polymer; and separating the thermoplastic particulates from the carrier fluid. More specific examples of such methods may comprise combining a thermoplastic polymer and nanoparticles in a carrier fluid at a heating temperature at or above a melting point or softening temperature of the thermoplastic polymer; wherein the thermoplastic polymer and the carrier fluid are substantially immiscible at the heating temperature; applying sufficient shear to disperse the thermoplastic polymer as liquefied droplets in the carrier fluid at the heating temperature; after liquefied droplets have formed, cooling the carrier fluid to at least a temperature at which thermoplastic particulates in a solidified state form, the thermoplastic particulates comprising the thermoplastic polymer and at least a portion of the nanoparticles associated with an outer surface of each of the thermoplastic particulates; and separating the thermoplastic particulates from the carrier fluid. Suitable examples of thermoplastic polymers and nanoparticles are provided hereinabove, any of which may be used for forming the thermoplastic particulates according to the disclosure herein. Once formed through melt emulsification, the thermoplastic particulates may be further processed to introduce the color-changing material, as described in further detail below.

FIG. 1 is a flow chart of non-limiting example method 100 for producing thermoplastic particulates in accordance with the present disclosure, wherein particulate formation takes place in the presence of nanoparticles. As shown, thermoplastic polymer 105, carrier fluid 104 and nanoparticles 106 are combined 108 to produce mixture 110. One or more surfactants, such as one or more sulfonate surfactants, may also be present in mixture 110. When present, up to about 25 wt. % surfactant relative to thermoplastic polymer 105 may be present in mixture 110. Thermoplastic polymer 105, carrier fluid 104, and nanoparticles 106 may be combined 108 in any order, with mixing and/or heating being conducted. In a particular example, carrier fluid 104 may be heated above a melting point or softening temperature of thermoplastic polymer 105 before combining the other components therewith.

Heating above the melting point or softening temperature of thermoplastic polymer 105 may be at any temperature below the decomposition temperature or boiling point of any of the components in the melt emulsion. In non-limiting examples, heating at a temperature about 1° C. to about 50° C., or about 1° C. to about 25° C., or about 5° C. to about 30° C., or about 20° C. to about 50° C. above the melting point or softening temperature of thermoplastic polymer 105 may be conducted. In the disclosure herein, melting points may be determined by ASTM E794-06(2018) with 10° C./min ramping and cooling rates. The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min. Melting points or softening temperatures in the present disclosure may range from about 50° C. to about 400° C., or about 60° C. to about 300° C.

Mixture 110 is then processed 112 by applying sufficient shear to produce liquefied droplets of thermoplastic polymer 105 at a temperature greater than the melting point or softening temperature of thermoplastic polymer 105, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents at higher shear rates. Examples of mixing apparatuses suitable for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 μm to about 1,000 μm, or about 1 μm to about 500 μm, or about 1 μm to about 200 μm, or about 1 μm to about 150 μm, or about 1 μm to about 130 μm, or about 1 μm to about 100 μm, or about 10 μm to about 150 μm, or about 10 μm to about 100 μm, or about 20 μm to about 80 μm, or about 20 μm to about 50 μm, or about 50 μm to about 90 μm. The resulting thermoplastic particulates formed after solidification may reside within similar size ranges. That is, the thermoplastic particulates in the particulate compositions and methods of the present disclosure may have a size of about 1 μm to about 1,000 μm, or about 1 μm to about 500 μm, or about 1 μm to about 200 μm, or about 1 μm to about 150 μm, or about 1 μm to about 130 μm, or about 1 μm to about 100 μm, or about 1 μm to about 200 μm, or about 10 μm to about 100 μm, or about 20 μm to about 80 μm, or about 20 μm to about 50 μm, or about 50 μm to about 90 μm. Particle size measurements may be made by analysis of optical images or using onboard software of a Malvern Mastersizer 3000 Aero S instrument, which uses light scattering techniques for particle size measurement. The foregoing particulate sizes may be maintained after incorporating a color-changing material upon the thermoplastic particulates.

For light scattering techniques, glass bead control samples with a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into thermoplastic particulates in a solidified state. The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate thermoplastic particulates 126 from other components 124 (e.g., carrier fluid 104, excess nanoparticles 106, and the like). Washing, filtering and/or the like may be conducted at this stage to purify thermoplastic particulates 122 further, wherein thermoplastic particulates 122 comprise thermoplastic polymer 105, and at least a portion of nanoparticles 106 coating the outer surface of thermoplastic particulates 122 as at least a partial coating. Depending upon non-limiting factors such as the temperature (including cooling rate), the type of thermoplastic polymer 105, and the types and sizes of nanoparticles 106, nanoparticles 106 may become at least partially embedded within the outer surface of thermoplastic particulates 122 in the course of becoming disposed thereon. Even without embedment taking place, nanoparticles 106 may remain robustly associated with thermoplastic particulates 122 to facilitate their further use.

In the foregoing, thermoplastic polymer 105 and carrier fluid 104 are chosen such that these components are immiscible or substantially immiscible (<5 wt. % solubility), particularly <1 wt. % solubility, at the various processing temperatures (e.g., from room temperature to the temperature at which liquefied droplets are formed and maintained as two or more phases).

After separating thermoplastic particulates 122 from other components 124, further processing 126 of thermoplastic particulates 122 may take place. In a non-limiting example further processing 126 may include, for example, sieving thermoplastic particulates 122 and/or blending thermoplastic particulates 122 with other substances to form processed thermoplastic particulates 128. Processed thermoplastic particulates 128 may be formulated for use in a desired application, such as additive manufacturing in a non-limiting example.

In another non-limiting example, further processing 126 may comprise incorporating the color-changing material, such as one or more conjugated diynes, upon thermoplastic particulates 122. Optionally, a surfactant (e.g., an anionic surfactant, a cationic surfactant, a neutral surfactant, or a zwitterionic surfactant) may be incorporated upon thermoplastic particulates 122 as well during further processing 126. Additional details concerning incorporation of a color-changing material upon thermoplastic particulates 122 are provided hereinbelow.

The thermoplastic particulates of the present disclosure may have a bulk density of about 0.3 g/cm$^3$ to about 0.8 g/cm$^3$, or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$.

Shear sufficient to form liquefied droplets may be applied through stirring the carrier fluid in particular examples of the present disclosure. In non-limiting examples, the stirring rate may range from about 50 rotations per minute (rpm) to about 1500 rpm, or about 250 rpm to about 1000 rpm, or about 225 rpm to about 500 rpm. The stirring rate while melting or softening the thermoplastic polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Loading (concentration) of the thermoplastic polymer in the carrier fluid may vary over a wide range. In non-limiting examples, the loading of the thermoplastic polymer in the carrier fluid may range from about 1 wt. % to about 99 wt. % relative to the weight of the carrier fluid. In more particular examples, the loading of the thermoplastic polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. %. The thermoplastic polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the thermoplastic polymer and the carrier fluid.

Upon forming thermoplastic particulates in the presence of nanoparticles according to the disclosure herein, at least a portion of the nanoparticles, such as silica nanoparticles or other oxide nanoparticles, may be disposed as a coating or partial coating upon the outer surface of the thermoplastic particulates. The coating may be disposed substantially uniformly upon the outer surface. As used herein with respect to a coating, the term "substantially uniform" refers to an even coating thickness in surface locations covered by the nanoparticles, particularly the entirety of the outer surface. Coating coverage upon the thermoplastic particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs.

Carrier fluids suitable for use in the disclosure herein include those in which the thermoplastic polymer is substantially immiscible with the carrier fluid, the carrier fluid has a boiling point exceeding the melting point or softening temperature of the thermoplastic polymer, and the carrier fluid has sufficient viscosity to form liquefied droplets of substantially spherical shape once the thermoplastic polymer has undergone melting therein. Suitable carrier fluids may include, for example, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, the like, and any combination thereof.

Suitable carrier fluids may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the thermoplastic polymer may be heated at a temperature of about 200° C. or above. Suitable heating temperatures may be chosen based upon the melting point or softening temperature of the thermoplastic polymer and the boiling point of the carrier fluid. A maximum heating temperature may be limited by the decomposition point of the carrier fluid and/or the thermoplastic polymer, but in many instances the maximum heating temperature may be up to about 300° C., preferably up to about 260° C. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Suitable carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Separating the thermoplastic particulates from the carrier fluid may take place by any of a variety of known separation techniques. Any of gravity settling and filtration, decantation, centrifugation, or the like may be used to separate the thermoplastic particulates from the carrier fluid. The thermoplastic particulates may then be washed with a solvent in which the carrier fluid is soluble and the thermoplastic particulates are insoluble in the course of the separation process. In addition, a solvent in which the carrier fluid is soluble and the thermoplastic particulates are insoluble may be mixed with the carrier fluid and the thermoplastic particulates before initially separating the elastomeric particulates from the carrier fluid. The solvent and/or the carrier fluid may be recycled for processing subsequent batches of thermoplastic particulates, if desired.

Suitable solvents for washing the thermoplastic particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof. After washing the thermoplastic particulates, any of heating, vacuum drying, air drying, or any combination thereof may be performed to remove residual solvent.

At least a majority of the thermoplastic particulates obtained according to the disclosure here may be substantially spherical in shape. More typically, about 90% or greater, or about 95% or greater, or about 99% or greater of the thermoplastic particulates produced by melt emulsification according to the present disclosure may be substantially spherical in shape. In other non-limiting examples, the thermoplastic particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to about 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a SYSMEX FPIA 3000 particle shape and particle size analyzer, available from Malvern Instruments). The circularity of the particulate is CEA/P, where CEA is the circumference of a circle having the area equivalent to the area (A) of the actual particulate.

The thermoplastic particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids" Characterized by Carr Indices."

Thermoplastic particulates isolated from the carrier fluid according to the disclosure above may be further processed to make the thermoplastic particulates suitable for an intended application. In one example, the thermoplastic particulates may be passed through a sieve or similar structure having an effective screening size that is greater than the average particle size of the thermoplastic particulates. For example, an illustrative screening size for processing thermoplastic particulates suitable for use in three-dimensional printing may have an effective screening size of about 150 µm. When referring to sieving, pore/screen sizes are described per U.S.A. Standard Sieve (ASTM E11-17). Other screening sizes, either larger or smaller, may be more suitable for thermoplastic particulates destined for use in other applications. Sieving may remove larger particulates that may have formed during the melt emulsification process and/or remove agglomerated particulates that may have poor flow characteristics. In general, sieves having an effective screening size ranging from about 10 µm to about 250 µm may be used.

In another particular example, further processing the thermoplastic particulates may comprise associating a color-changing material with the thermoplastic particulates following their formation under melt emulsification conditions, as described above. The color-changing material, such as a conjugated diyne, may be dissolved or suspended in a solvent and then contacted with the thermoplastic particulates. Suitable solvents may be chosen such that they do not appreciably swell the thermoplastic particulates or otherwise impact their powder flow performance. In a non-limiting example, the color-changing material may be dissolved or suspended in the same solvent used for washing the thermoplastic particulates following their synthesis through melt emulsification or in a similar type of solvent, such as heptane or a similar saturated hydrocarbon solvent.

Contacting the thermoplastic particulates and the color-changing material in the solvent may take place under static or non-static conditions at a temperature ranging from about 0° C. up to the reflux temperature of the solvent. Preferably, contacting may take place at room temperature. Non-static contacting conditions may include stirring, sonication, or any combination thereof. Contacting times for incorporating the color-changing material upon the thermoplastic particulates may range from about 1 minute to about 24 hours, or about 10 minutes to about 12 hours, or about 30 minutes to about 6 hours, or about 1 hour to about 4 hours, or about 6 hours to about 12 hours.

After the color-changing material has been suitably associated with the thermoplastic particulates, the thermoplastic particulates may be isolated from the solvent, such as through filtration, decantation, centrifugation, or any combination thereof. Drying of the thermoplastic particulates may then take place before use.

In addition, the thermoplastic particulates, after having the color-changing material associated therewith, may be mixed with one or more additional components such as flow aids, fillers or other substances intended to tailor the properties of the thermoplastic particulates for an intended application. Mixing of the additional components with the thermoplastic particulates may be conducted by dry blending techniques. The additional components may be included in an amount such that the above-described color change remains observable. Suitable examples of flow aids (e.g., carbon black, graphite, silica, and the like) and similar substances will be familiar to one having ordinary skill in the art. Additional sieving of the thermoplastic particulates may also take place at this stage and/or after association of the color-changing material, if needed.

In particular applications, the particulate compositions disclosed herein may be utilized in additive manufacturing processes, especially those employing selective laser sintering or other powder bed fusion processes to promote particulate consolidation.

Depending on how particulate consolidation is performed, a printed object formed through particulate consolidation of thermoplastic particulates bearing a color-changing material may be colorless (i.e., have a coloration determined primarily by the thermoplastic polymer) or be in a first coloration state determined primarily by the color-changing material, and possibly enhanced by the presence of nanoparticles. For example, in the case of a conjugated diyne such as 10,12-pentacosadiynoic acid, a printed object obtained through particulate consolidation with an infrared laser (e.g., a $CO_2$ laser or similar infrared or near-infrared laser) may leave the conjugated diyne initially unactivated and the printed object in a substantially colorless state. Thereafter, the conjugated diyne may be activated through ultraviolet photoirradiation to promote polymerization of the conjugated diyne into a diacetylene polymer, which may afford a first coloration state to the printed object. In the case of 10,12-pentacosaidynoic acid and similar conjugated diynoic acids, the first coloration state may be blue or a blue shade. The complete printed object may be converted to the first coloration state through irradiating the entirety of the outer surface of the printed object, or the first coloration may be introduced selectively upon the printed object, such as through localized UV irradiation of specified positions upon the surface of the printed object.

After forming the first coloration state, a second coloration state may be introduced into the printed object through thermal treatment. The second coloration state may be reached by heating the printed object to a temperature ranging from about 30° C. to about 200° C. In the case of 10,12-pentacosadiynoic acid, the second coloration state may be a red to magenta color attained by heating the printed object to about 50° C., or the second coloration state may be yellow or a yellow shade by heating the printed object to about 150° C. The entirety of the outer surface of the printed object may be converted to the second coloration state, or the second coloration state may be introduced selectively through localized heating. Alternately, after producing the second coloration state, any of the conjugated diyne not previously converted to the first coloration state may converted to the first coloration state through UV irradiation. Thus, in some instances it is possible for the first coloration state and the second coloration state to be co-present in combination with one another in a printed object, in addition to colorless areas in which the color-changing material has not been activated. In addition, for any areas produced in the first coloration state after already producing the second coloration state, the newly produced first coloration state may be converted to a second coloration state that is the same as or different than that produced previously. For example, a printed object having a yellow second coloration state may be produced in combination with a blue first coloration state through subsequent activation of a conjugated diyne. Thereafter, the blue first coloration state may be activated to produce a red or magenta second coloration state. Thus, depending on particular application needs, a wide range of color combinations may be attainable.

Accordingly, additive manufacturing processes of the present disclosure may afford printed objects having a polymer matrix comprising a thermoplastic polymer, and a color-changing material associated with the polymer matrix, wherein the color-changing material is both photochromic and thermochromic. The color-changing material may comprise one or more conjugated diynes or a polymerized form thereof, wherein the polymerized form may afford a first coloration state and/or a second coloration state different from the first coloration state to at least a portion of the printed object. For example, in at least a portion of a printed object, at least a majority of one or more conjugated diynes may be present as the polymerized form and convey a first coloration state to the portion of the printed object. The polymerized form may be modified by heating such that the portion of the printed object has a second coloration state different than the first coloration state in at least a portion of the printed object.

A plurality of nanoparticles may also be present within the polymer matrix, such as a plurality of silica nanoparticles or other types of oxide nanoparticles. Advantageously, silica nanoparticles may intensify the coloration obtained from the first coloration state and/or the second coloration state. A surfactant may also be present within the polymer matrix as well.

Additive manufacturing processes of the present disclosure may comprise providing a particulate composition comprising a plurality of thermoplastic particulates comprising a thermoplastic polymer, and a color-changing material associated with the thermoplastic particulates, wherein the color-changing material is both photochromic and thermochromic, and forming a printed object having a polymer matrix comprising the thermoplastic polymer and the color-changing material associated with the polymer matrix. Preferably, the thermoplastic particulates have a plurality of nanoparticles, such as silica nanoparticles or other oxide nanoparticles, disposed upon an outer surface of the thermoplastic particulates, such that the silica nanoparticles or other oxide nanoparticles are present within the polymer matrix upon forming a printed object. In more particular examples, methods for forming a printed object according to the present disclosure may comprise depositing the particulate composition in a powder bed, and consolidating a portion of the thermoplastic particulates in the powder bed.

Methods for forming a printed object according to the present disclosure may comprise introducing coloration to the printed object. In particular, methods of the present disclosure may comprise exposing at least a portion of the printed object to first activation conditions, such as photoirradiation (e.g., UV irradiation), sufficient to convert the color-changing material into a polymerized form of the color-changing material having a first coloration state. Thereafter, as needed, methods of the present disclosure may comprise exposing at least a portion of the printed object to second activation conditions, such as thermal activation, sufficient to convert the polymerized form of the color-changing material into a second coloration state different from the first coloration state. The first coloration state and the second coloration state may be present together in a given printed object through localized application of the first and second activation conditions.

Suitable conditions for performing selective laser sintering or other powder bed particulate consolidation processes to form a printed object are not believed to be especially limited. Depending on the desired outcome, the particulate consolidation processes may or may not also promote polymerization of the conjugated diyne to produce the first coloration state. That is, depending on how particulate consolidation is performed, the printed object or a portion thereof may be in an initial coloration state primarily determined by the thermoplastic polymer (e.g., white or colorless), which is then converted to a first coloration state determined by a polymerized form of the conjugated diyne. Lasers suitable for performing selective laser sintering without activating a conjugated diyne may include both continuous wave lasers and pulsed wave lasers, either of which may provide the energy needed to promote consolidation of thermoplastic particulates. $CO_2$ lasers are commonly used to promote consolidation of thermoplastic particulates during selective laser sintering due to the high absorptivity of the polymers to the $CO_2$ laser emission wavelength. The operating conditions of the $CO_2$ laser may be chosen such that particulate consolidation occurs in preference to activation of the conjugated diyne. Standard laser settings for promoting consolidation of thermoplastic particulates (e.g., power, scanning rate, bed temperature, and the like) may be selected based on the particular thermoplastic polymer that is present, and suitable laser settings may be chosen by one having ordinary skill in the art. The choice of particular conditions for conducting selective laser sintering or similar powder consolidation techniques may be influenced by non-limiting factors such as, for example, the type of thermoplastic polymer being used, the size and composition of the thermoplastic particulates, the type of printed object being produced, and the intended use conditions for the printed object.

Heating of at least a portion of a printed object may be conducted radiantly over substantially the entirety of the surface of a printed object, or heating may be localized such as through directed heating, such as with a laser or heated air flow. Other techniques for producing localized heating may also be suitable and will be recognizable to one having ordinary skill in the art.

Examples of printed objects formable using the particulate compositions disclosed herein are not considered to be particularly limited and may include, for example, containers (e.g., for food, beverages, cosmetics, personal care compositions, medicine, and the like), shoe soles, toys, furniture parts, decorative home goods, plastic gears, screws, nuts, bolts, cable ties, medical items, prosthetics, orthopedic implants, learning aids, 3D anatomy models, robotics, biomedical devices (orthotics), home appliances, dentistry, automotive and airplane/aerospace parts, electronics, sporting goods, and the like. The ability to manufacture these and other types of printed objects in a range of colors may be advantageous, as discussed hereinafter.

In a specific example, the particulate compositions disclosed herein may comprise at least a portion of an autonomous temperature sensor. In particular, a printed object may comprise a patterned location of the color-changing material activated to a first coloration state (e.g., blue in the case of a conjugated diyne). Alternately, a decal or similar label comprising a patterned mark of the thermoplastic polymer and the color-changing material activated to a first coloration state may be applied to an existing object, which may be printed or non-printed. Thereafter, further thermal activation of the color-changing material into a second coloration state may be indicative of conditions to which the object has been exposed.

Embodiments disclosed herein include:

A. Particulate compositions comprising powder particulates. The particulate compositions comprise: a plurality of thermoplastic particulates comprising a thermoplastic polymer, and a color-changing material associated with the thermoplastic particulates, the color-changing material being both photochromic and thermochromic.

B. Printed objects. The printed objects comprise: a polymer matrix comprising a thermoplastic polymer; and a color-changing material associated with the polymer matrix, the color-changing material being both photochromic and thermochromic.

C. Methods for forming a printed object by particulate consolidation. The methods comprise: providing a particulate composition comprising a plurality of thermoplastic particulates comprising a thermoplastic polymer, and a color-changing material associated with the thermoplastic particulates, the color-changing material being both photochromic and thermochromic; and forming a printed object having a polymer matrix comprising the thermoplastic polymer and the color-changing material associated with the polymer matrix.

Each of embodiments A-C may have one or more of the following additional elements in any combination:

Element 1: wherein the color-changing material comprises one or more conjugated diynes.

Element 2: wherein the one or more conjugated diynes comprise a conjugated diyne carboxylic acid or a derivative thereof.

Element 3: wherein the conjugated diyne carboxylic acid comprises 10,12-pentacosadiynoic acid.

Element 4: wherein the particulate composition further comprises a plurality of nanoparticles disposed upon an outer surface of each of the plurality of thermoplastic particulates, the plurality of nanoparticles comprising a plurality of oxide nanoparticles.

Element 5: wherein the plurality of oxide nanoparticles comprises a plurality of silica nanoparticles.

Element 6: wherein the silica nanoparticles are hydrophobically modified.

Element 7: wherein the particulate compositions further comprise a surfactant associated with an outer surface of the thermoplastic particulates.

Element 8: wherein the color-changing material comprises one or more conjugated diynes or a polymerized form thereof.

Element 9: wherein at least a majority of the one or more conjugated diynes is present as the polymerized form and the printed object has a first coloration state.

Element 10: wherein the polymerized form is modified by heating and the printed object has a second coloration state different from the first coloration state.

Element 11: wherein the printed object further comprises a plurality of nanoparticles present within the polymer matrix, the plurality of nanoparticles comprising a plurality of oxide nanoparticles.

Element 12: wherein the printed object further comprises a surfactant present within the polymer matrix.

Element 13: wherein forming the printed object comprises: depositing the particulate composition in a powder bed; and consolidating a portion of the thermoplastic particulates in the powder bed.

Element 14: wherein the method further comprises: exposing at least a portion of the printed object to first activation conditions sufficient to convert the color-changing material into a polymerized form of the color-changing material having a first coloration state. Element 15: wherein the first activation conditions comprise photoirradiation of the printed object.

Element 16: wherein the method further comprises exposing at least a portion of the printed object to second activation conditions sufficient to convert the polymerized form of the color-changing material into a second coloration state different from the first coloration state.

Element 17: wherein the second activation conditions comprise thermal treatment of the printed object.

Element 18: wherein the plurality of thermoplastic particulates further comprises a plurality of nanoparticles disposed upon an outer surface of each of the plurality of thermoplastic particulates, the plurality of nanoparticles comprising a plurality of oxide nanoparticles.

Element 19: wherein a surfactant is associated with an outer surface of the thermoplastic particulates.

By way of non-limiting example, exemplary combinations applicable to A include, but are not limited to: 1 and 4; 1, 2 or 3, and 4; 1-4 and 5; 1, 2 or 3, and 4 or 5; 1 and 7; 1, 4 and 7; 1, 2 or 3, 4 and 7; 1-4, 5 and 7; 4 and 7; and 4, 5 and 7. Exemplary combinations applicable to B include, but are not limited to, 8 and 9; 8-10; 8 and 11; 8, 5 and 11; 8 and 12; 8, 11 and 12; 8, 5, 11 and 12; 5 and 11; 5, 11 and 12; and 11 and 12. Exemplary combinations applicable to C include, but are not limited to, 13 and 14; 13-15; 13 and 16; 13, 14 and 16; 13-16; 13, 16 and 17; 13-17; any of the foregoing in further combination with 1; 1, and 2 or 3; 18; 19; 18 and 19; 18 and 5; and 18, 5 and 19.

To facilitate a better understanding of the present disclosure, the following examples of preferred or representative embodiments are given. In no way should the following examples be read to limit, or to define, the scope of the invention.

EXAMPLES

Polyether block amide (PEBA, VESTAMID E40S3, polyamide-12, Evonik) was processed into powder particulates through melt emulsification in the following examples. Where noted, silica nanoparticles were included during the melt emulsification process.

UV irradiation was performed using a 254 nm short wavelength irradiation lamp (Spectroline Model ENF-260C, Spectronics Corporation). Irradiation was performed at a 7 cm distance from the sample.

Heating was performed using an IKA RCT basic hot plate set at a specified temperature.

Sample coloration was determined using a XRITE 528 spectrophotodensiometer.

Syntheses

Sample 1: A 500 mL glass reactor was loaded with 160 g silicone oil (PSF 10,000, Clearco) and heated to 200° C. under nitrogen at a stirring rate of 500 rpm. VESTAMID E40S3 polymer particles (40 g) were added to the reactor and stirring was continued for an additional 30 minutes. The mixture was then cooled to room temperature, and the resulting polymer particulates were separated by vacuum filtration on Whatman filter paper. The polymer particulates were washed 3 times on the filter paper with heptane.

10,12-Pentacosadiynoic acid was then incorporated with the polymer particulates. 0.8 g Polymer particulates and 0.2 g 10,12-pentacosadiynoic acid were combined in 9 g ethanol, and the mixture was stirred at 1000 rpm for 2 hours at room temperature. Sonication was then performed for 1 hour, and the mixture was stored at 4° C. for 12 hours. The polymer particulates were then collected by filtration and dried for 24 hours.

Sample 2: Sample 1 was repeated except 0.05 g anionic surfactant (sodium dodecylbenzenesulfonate-SDBS) was combined with the polymer particulates and the 10,12-pentacosadiynoic acid in the ethanol.

Sample 3: Sample 1 was repeated except 0.05 g cationic surfactant (cetyltrimethylammonium bromide-CTAB) was combined with the polymer particulates and the 10,12-pentacosadiynoic acid in the ethanol.

Sample 4: Sample 1 was repeated except 0.4 g hydrophobically modified silica nanoparticles (AEROSIL R972, dimethyldichlorosilane modified, 90-130 $m^2/g$ surface area by BET) were included in the silicone oil during melt emulsification. Isolation of the polymer particulates and incorporation of the 10,12-pentacosadiynoic acid were conducted as above.

Sample 5: Sample 1 was repeated except 0.4 g hydrophobically modified silica nanoparticles (AEROSIL RX50, hexamethyldisilazene modified, 25-45 $m^2/g$ surface area by BET) were included in the silicone oil during melt emulsification. Isolation of the polymer particulates and incorporation of the 10,12-pentacosadiynoic acid were conducted as above.

Sample 6: Sample 1 was repeated except 0.4 g hydrophobically modified silica nanoparticles (AEROSIL R812S, hexamethyldisilazene modified, 195-245 $m^2/g$ surface area by BET) were included in the silicone oil during melt emulsification. Isolation of the polymer particulates and incorporation of the 10,12-pentacosadiynoic acid were conducted as above.

Sample 7: Sample 1 was repeated except 0.4 g hydrophobically modified silica nanoparticles (AEROSIL R812S, hexamethyldisilazene modified, 195-245 $m^2/g$ surface area by BET) were included in the silicone oil during melt emulsification, and 0.05 g anionic surfactant (sodium dodecylbenzenesulfonate-SDBS) was combined with the polymer particulates in ethanol along with the 10,12-pentacosadiynoic acid. Isolation of the polymer particulates and incorporation of the 10,12-pentacosadiynoic acid were conducted as above.

Sample 8: Sample 1 was repeated except 0.4 g hydrophobically modified silica nanoparticles (AEROSIL R812S, hexamethyldisilazene modified, 195-245 $m^2/g$ surface area by BET) were included in the silicone oil during melt emulsification, and 0.05 g cationic surfactant (cetyltrimethylammonium bromide-CTAB) was combined with the polymer particulates in ethanol along with the 10,12-pentacosadiynoic acid. Isolation of the polymer particulates and incorporation of the 10,12-pentacosadiynoic acid were conducted as above.

Sample 9: Sample 1 was repeated except 0.4 g hydrophilic fumed silica nanoparticles (AEROSIL 380, 350-410 $m^2/g$ surface area by BET) were included in the silicone oil during melt emulsification. Isolation of the polymer particulates and incorporation of the 10,12-pentacosadiynoic acid were conducted as above.

Sample 10: Sample 1 was repeated, except ethanol was substituted with heptane when incorporating the 10,12-pentacosadiynoic acid.

Sample 11: Sample 2 was repeated, except ethanol was substituted with heptane when incorporating the 10,12-pentacosadiynoic acid.

Sample 12: Sample 3 was repeated, except ethanol was substituted with heptane when incorporating the 10,12-pentacosadiynoic acid.

Sample 13: Sample 4 was repeated, except ethanol was substituted with heptane when incorporating the 10,12-pentacosadiynoic acid.

Sample 14: Sample 5 was repeated, except ethanol was substituted with heptane when incorporating the 10,12-pentacosadiynoic acid.

Sample 15: Sample 6 was repeated, except ethanol was substituted with heptane when incorporating the 10,12-pentacosadiynoic acid.

Sample 16: Sample 7 was repeated, except ethanol was substituted with heptane when incorporating the 10,12-pentacosadiynoic acid.

Sample 17: Sample 8 was repeated, except ethanol was substituted with heptane when incorporating the 10,12-pentacosadiynoic acid.

Sample 18: Sample 9 was repeated, except ethanol was substituted with heptane when incorporating the 10,12-pentacosadiynoic acid.

Table 1 below summarizes the composition of Samples 1-18 prepared as above. The average particle size (D50) of Samples 1-9 was 82 microns and span was 1.865. For Samples 10-18, the average particle size was 72 microns and the span was 2.182. Average particle size measurements were determined by light scattering using a Malvern Mastersizer 3000 Aero S particle size analyzer. Glass bead control samples having a diameter within the range of 15 μm to 150 μm under the tradename Quality Audit Standards QAS4002™ obtained from Malvern Analytical Ltd. were used. Samples were analyzed as dry powders dispersed in air using the dry powder dispersion module of the Mastersizer 3000 Aero S. Particle sizes were derived using the instrument software from a plot of volume density as a function of size.

TABLE 1

| Sample No. | Silica Type | Surfactant | Solvent |
|---|---|---|---|
| 1 | none | none | ethanol |
| 2 | none | SDBS | ethanol |
| 3 | none | CTAB | ethanol |
| 4 | AEROSIL R972 | none | ethanol |
| 5 | AEROSIL RX50 | none | ethanol |
| 6 | AEROSIL R812S | none | ethanol |
| 7 | AEROSIL R812S | SDBS | ethanol |
| 8 | AEROSIL R812S | CTAB | ethanol |
| 9 | AEROSIL 380 | none | ethanol |
| 10 | none | none | heptane |
| 11 | none | SDBS | heptane |
| 12 | none | CTAB | heptane |
| 13 | AEROSIL R972 | none | heptane |
| 14 | AEROSIL RX50 | none | heptane |
| 15 | AEROSIL R812S | none | heptane |
| 16 | AEROSIL R812S | SDBS | heptane |
| 17 | AEROSIL R812S | CTAB | heptane |
| 18 | AEROSIL 380 | none | heptane |

Samples obtained through ethanol incorporation of the 10,12-pentacosadiynoic acid (Samples 1-9) experienced some swelling and aggregation, such that a free-flowing powder of polymer particulates was not obtained. In contrast, heptane incorporation of the 10,12-pentacosadiynoic acid (Samples 10-18) afforded a free flowing powder of polymer particulates.

Color Activation

Samples 1-18 were essentially white following their synthesis. Thereafter, a thin layer of sample deposited upon filter paper was activated through UV irradiation at 254 nm or sequential UV irradiation at 254 nm followed by heating at 50° C. or 150° C. UV irradiation quickly turned the samples blue (<10 seconds). Heating at 50° C. after UV irradiation led to formation of a red to magenta color, whereas heating at 150° C. led to formation of a yellow color, as shown in FIGS. 2A, 2B, 3A and 3B below. Both the red/magenta color and the yellow color persisted after heating was discontinued and the samples returned to room temperature.

Figure 2A:
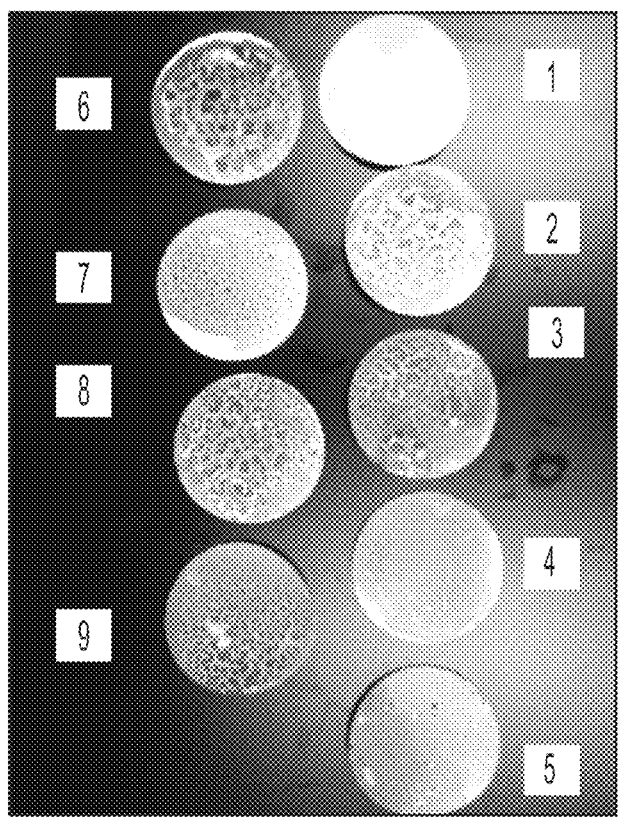
FIG. 2A shows photographs of Samples 1-9 after UV irradiation at 254 nm.
Figure 2B:
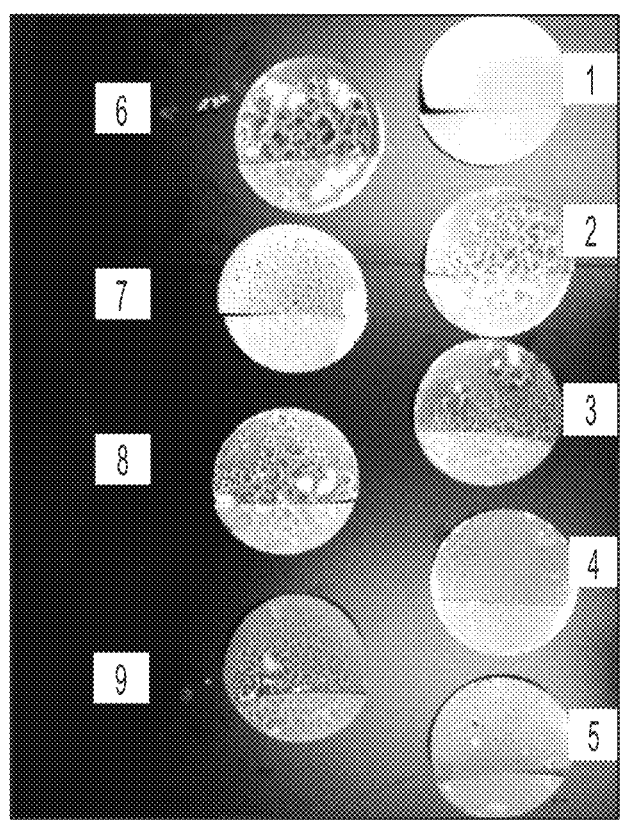
FIG. 2B shows corresponding photographs of Samples 1-9 after UV irradiation and heat treatment at 50° C.

FIG. 2A shows photographs of Samples 1-9 after UV irradiation at 254 nm. FIG. 2B shows corresponding photographs of Samples 1-9 after UV irradiation and heat treatment at 50° C. As shown, a blue color resulted from UV irradiation (grayscale images in FIG. 2A, and left side of samples in FIG. 2B). Heating of a portion of the samples upon the filter paper resulted in formation of a red to magenta color (grayscale images on right side of samples in FIG. 2B). Coloration variation in the images results from coverage irregularity arising from uneven drying of the samples upon the filter paper.

Figure 3A:
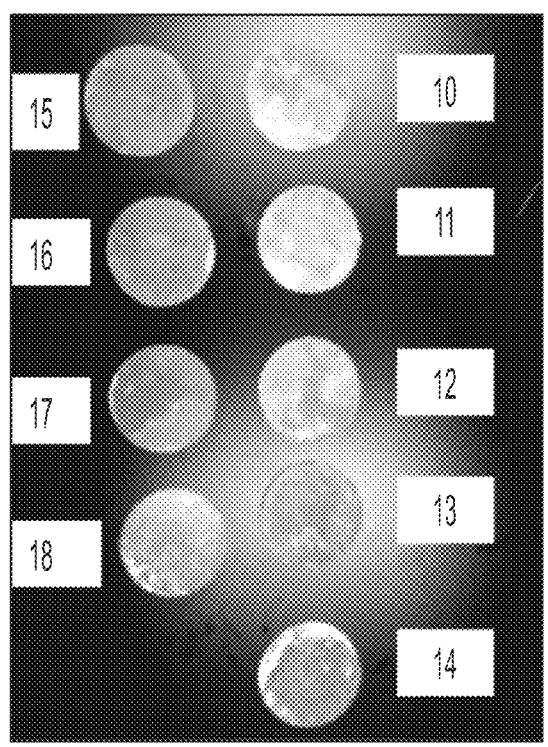
FIG. 3A shows photographs of Samples 10-18 after UV irradiation at 254 nm.
Figure 3B:
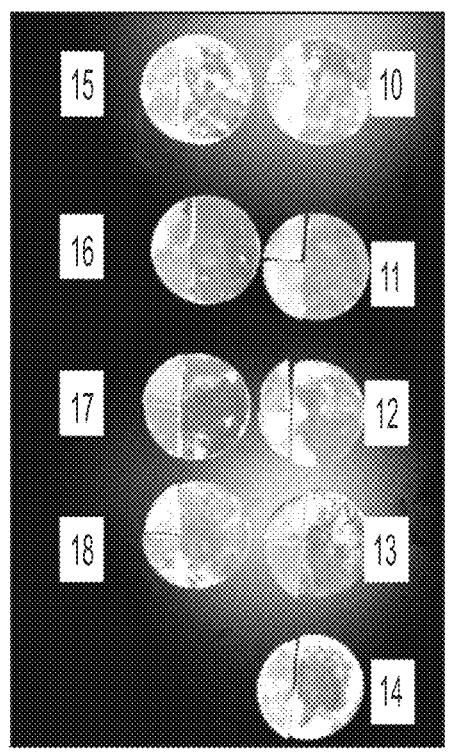
FIG. 3B shows corresponding photographs of Samples 10-18 after UV irradiation, followed by heat treatment at 50° C. or 150° C.

FIG. 3A similarly shows photographs of Samples 10-18 after UV irradiation at 254 nm. FIG. 3B shows corresponding photographs of Samples 10-18 after UV irradiation, followed by heat treatment at 50° C. or 150° C. As shown, a blue color again resulted from UV irradiation (grayscale images in FIG. 3A and right side of samples in FIG. 3B). Heating of a portion of the samples upon the filter paper at 50° C. resulted in formation of a red to magenta color (grayscale images on lower left side of samples in FIG. 3B). Further heating at 150° C. of a portion of the samples already heated at 50° C. resulted in formation of a yellow color (grayscale images on upper left side of samples in FIG. 3B). Neither color changed upon cooling the samples. Coloration variation in the images results from coverage irregularity arising from uneven drying of the samples upon the filter paper.

Among Samples 1-9, the lightest blue color was obtained in the absence of silica nanoparticles and surfactants (Sample 1). Anionic and cationic surfactants both increased the intensity of the blue color when no silica was present (Samples 2 and 3). The blue color increased further in intensity when silica nanoparticles were present, and the strongest blue color was obtained in the presence of AEROSIL R812S silica (Sample 6). In the presence of silica nanoparticles, anionic and cationic surfactants had minimal effect on the intensity of the blue color. Colorspace measurements for Samples 1-9 obtained using an XRITE 528 spectrophotodensiometer following UV irradiation for various times are summarized in Table 2 below. L* (lightness), a* (green/yellow) and b* (blue/yellow) values were obtained for each irradiation time. The colorspace measurements were in general agreement with the qualitative visual observations.

TABLE 2

| | Irradiation Time (s) | | | | | | | | |
|---|---|---|---|---|---|---|---|---|---|
| | L* | | | a* | | | b* | | |
| | 10 | 30 | 60 | 10 | 30 | 60 | 10 | 30 | 60 |
| Sample 1 | 67.95 | 67.44 | 68.03 | −12.39 | −12.26 | −12.68 | −23.42 | −24.81 | −24.05 |
| Sample 2 | 45.74 | 40.86 | 41.63 | −11.04 | −10.35 | −10.18 | −31.22 | −33.3 | −32.17 |
| Sample 3 | 34.45 | 35.24 | 23.27 | −4.83 | −4.66 | −2.91 | −33.18 | −33.6 | −33.13 |
| Sample 4 | 55.13 | 51.77 | 47.61 | −11.78 | −11.92 | −9.95 | −28.69 | −28.62 | −27.82 |
| Sample 5 | 47.85 | 45.06 | 45.58 | −5.58 | −5.3 | −5.71 | −30.31 | −33.72 | −33.03 |
| Sample 6 | 30.36 | 24.79 | 26.02 | −5.95 | −3.44 | −4.28 | −28.5 | −28.07 | −28.23 |
| Sample 7 | 36.06 | 40.26 | 37.37 | −9.64 | −9.76 | −9.72 | −28.46 | −25.83 | −27.8 |
| Sample 8 | 36.39 | 37.67 | 35.69 | −10.51 | −10.83 | −10.25 | −24.23 | −24.09 | −23.44 |
| Sample 9 | 31.01 | 29.31 | 30.94 | −2.79 | −1.63 | −2.73 | −32.28 | −30.17 | −32.11 |

Figure 4A:
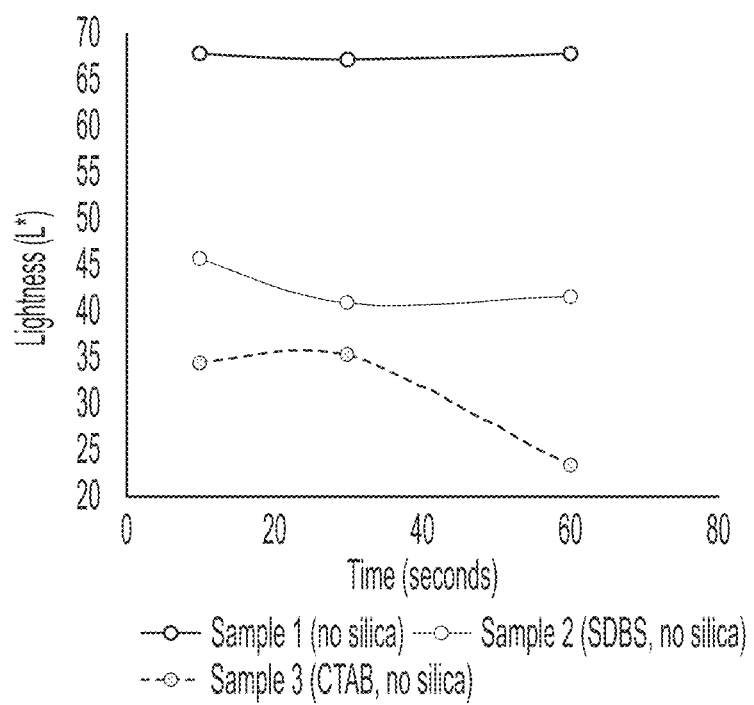
FIG. 4A is a plot of colorspace lightness (L*) for Samples 1, 2 and 3 as a function of irradiation time.
Figure 4B:
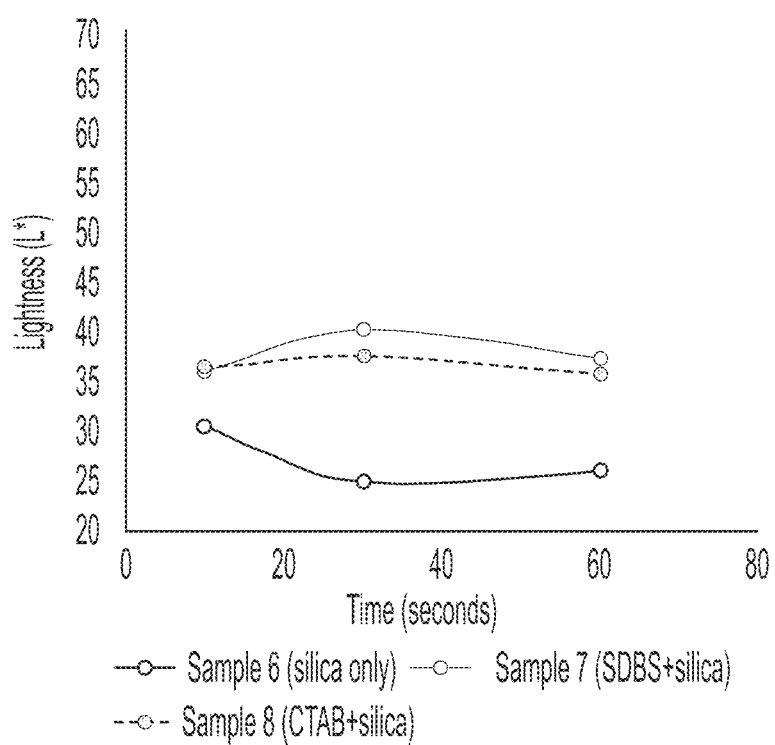
FIG. 4B is a plot of colorspace lightness (L*) for Samples 6, 7 and 8 as a function of irradiation time.
Figure 5A:
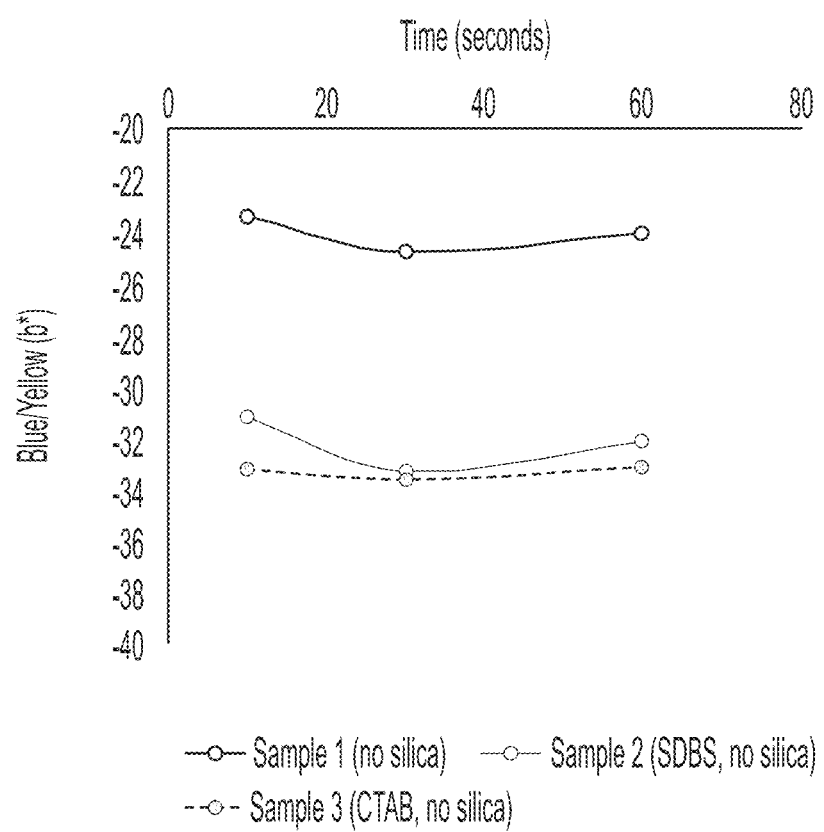
FIGS. 5A and 5B are the corresponding plots of colorspace blue/yellow value (b*) as a function of irradiation time.
Figure 5B:
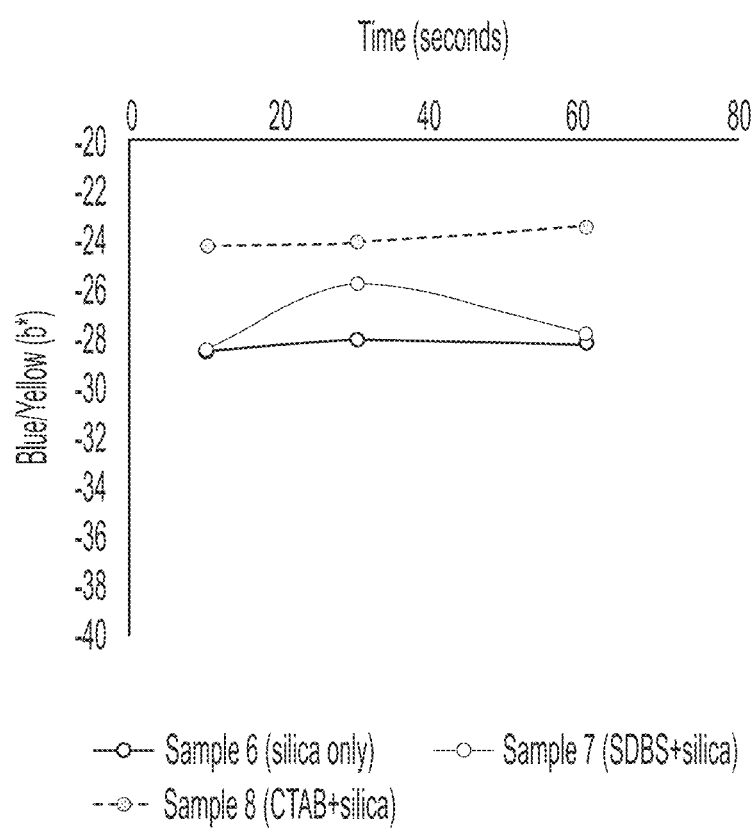

FIG. 4A is a plot of colorspace lightness (L*) for Samples 1, 2 and 3 as a function of irradiation time. FIG. 4B is a plot of colorspace lightness (L*) for Samples 6, 7 and 8 as a function of irradiation time. FIGS. 5A and 5B are the corresponding plots of colorspace blue/yellow value (b*) as a function of irradiation time. As shown, consistent colorspace lightness and colorspace blue/yellow values were reached after only a short irradiation time, and the values were only minimally impacted by the presence of anionic or cationic surfactants.

Figure 6:
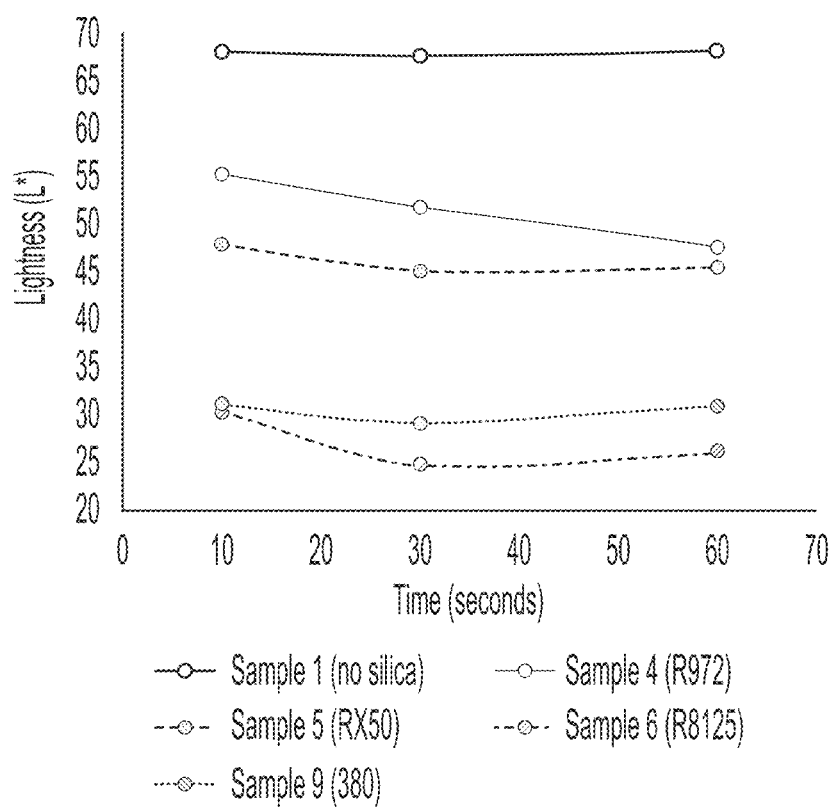
FIG. 6 is a plot of colorspace lightness (L*) for Samples 1, 4, 5, 6 and 9 as a function of irradiation time.
Figure 7:
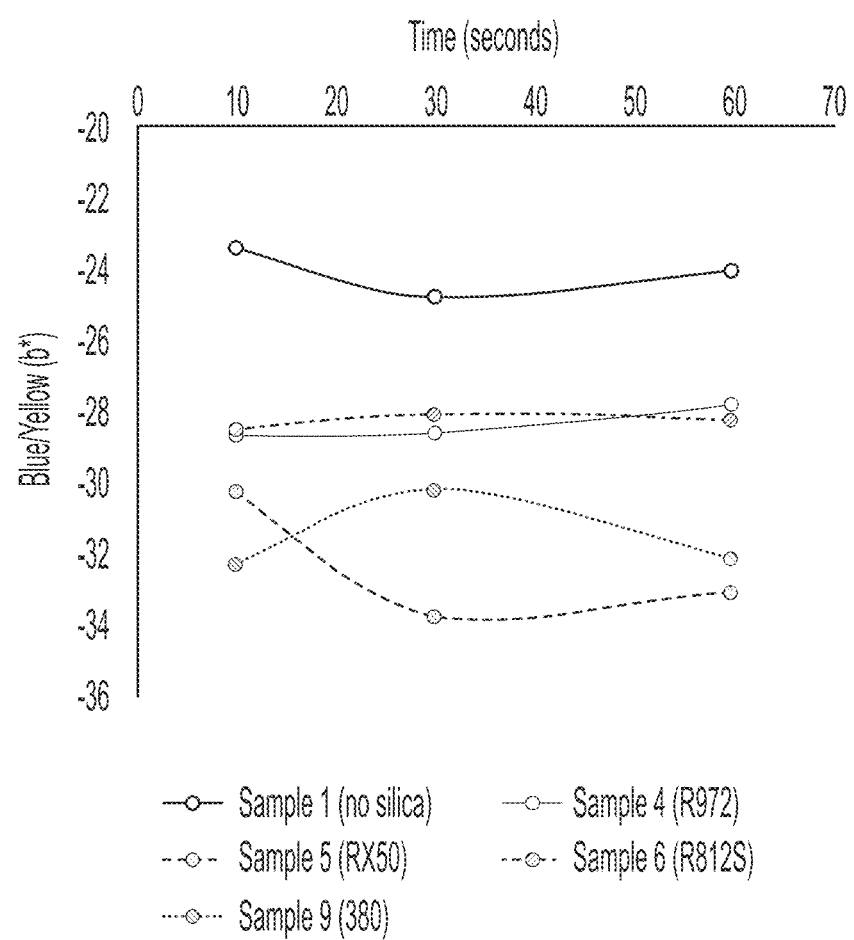
FIG. 7 is the corresponding plot of colorspace blue/yellow value (b*) as a function of irradiation time.

FIG. 6 is a plot of colorspace lightness (L*) for Samples 1, 4, 5, 6 and 9 as a function of irradiation time. FIG. 7 is the corresponding plot of colorspace blue/yellow value (b*) as a function of irradiation time. As shown, various grades of silica nanoparticles imparted different degrees of lightness to the polymer particulates, all of which were stronger in color than in polymer particulates lacking silica nanoparticles. The effect of different types of silica nanoparticles on colorspace blue/yellow values was considerably less pronounced. Minimal changes in the colorspace lightness and colorspace blue/yellow values occurred at longer irradiation times.

Among Samples 10-18, the lightest blue color was again obtained in the absence of silica nanoparticles and surfactants (Sample 10). In general, samples containing silica nanoparticles (Samples 13-18) afforded a darker blue color. Colorspace measurements for Samples 10-18 obtained using a XRITE 528 spectrophotodensiometer following UV irradiation are summarized in Table 3 below. L* (lightness), a* (green/yellow) and b* (blue/yellow) values were obtained for each irradiation time.

TABLE 3

| | Irradiation Time (s) | | | | | | | | |
|---|---|---|---|---|---|---|---|---|---|
| | L* | | | a* | | | b* | | |
| | 10 | 30 | 60 | 10 | 30 | 60 | 10 | 30 | 60 |
| Sample 10 | 69.04 | 54.73 | 49.19 | −13.25 | −14.15 | −12.92 | −15.46 | −19.19 | −20.26 |
| Sample 11 | 70.48 | 59.69 | 46.95 | −11.26 | −13.26 | −12.58 | −13.33 | −15.09 | −18.58 |
| Sample 12 | 64.70 | 52.97 | 42.85 | −12.56 | −13.97 | −9.99 | −17.20 | −19.55 | −18.70 |
| Sample 13 | 59.67 | 48.82 | 40.29 | −12.50 | −12.49 | −9.43 | −15.52 | −19.63 | −19.70 |
| Sample 14 | 62.60 | 48.86 | 41.70 | −13.30 | −12.28 | −9.03 | −17.73 | −20.49 | −18.44 |
| Sample 15 | 63.15 | 50.32 | 39.73 | −13.59 | −12.17 | −8.47 | −13.06 | −16.96 | −16.85 |
| Sample 16 | 60.18 | 46.22 | 40.81 | −10.88 | −11.19 | −9.07 | −13.19 | −17.89 | −18.20 |
| Sample 17 | 60.84 | 44.05 | 37.15 | −13.14 | −8.61 | −3.80 | −17.74 | −19.92 | −16.39 |
| Sample 18 | 60.97 | 46.89 | 45.60 | −12.96 | −12.40 | −10.65 | −14.88 | −18.31 | −16.39 |

Figure 8:
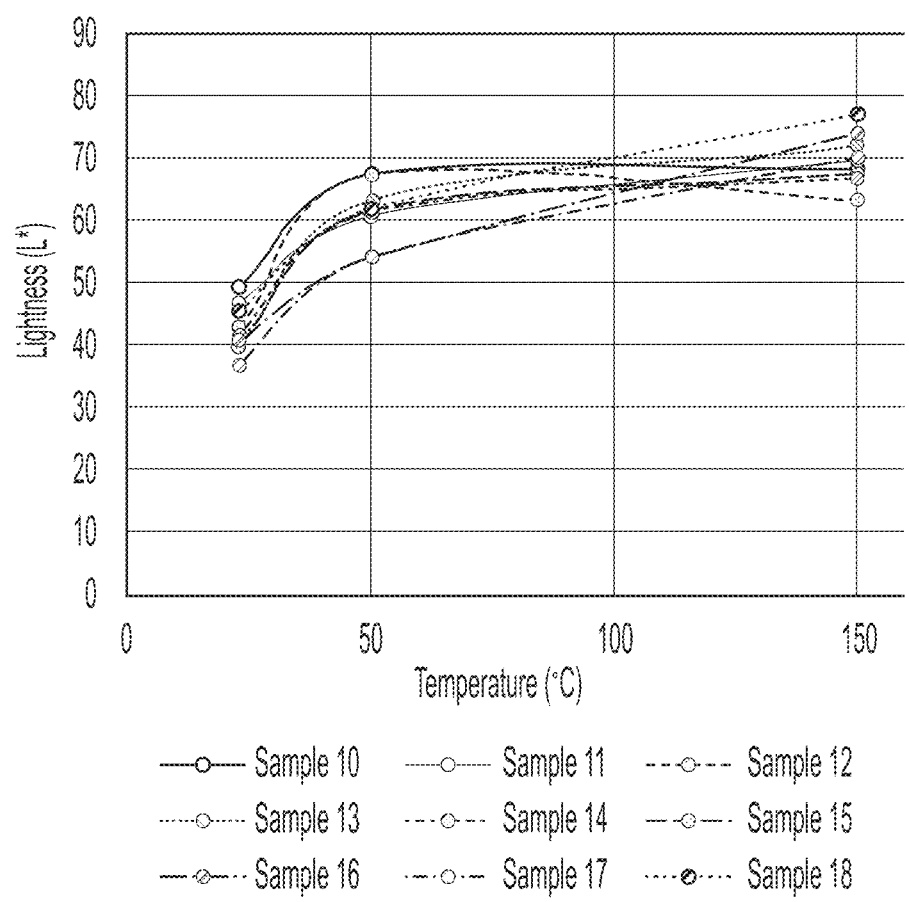
FIG. 8 is a plot of colorspace lightness (L*) for Samples 10-18 as a function of heating temperature.
Figure 9:
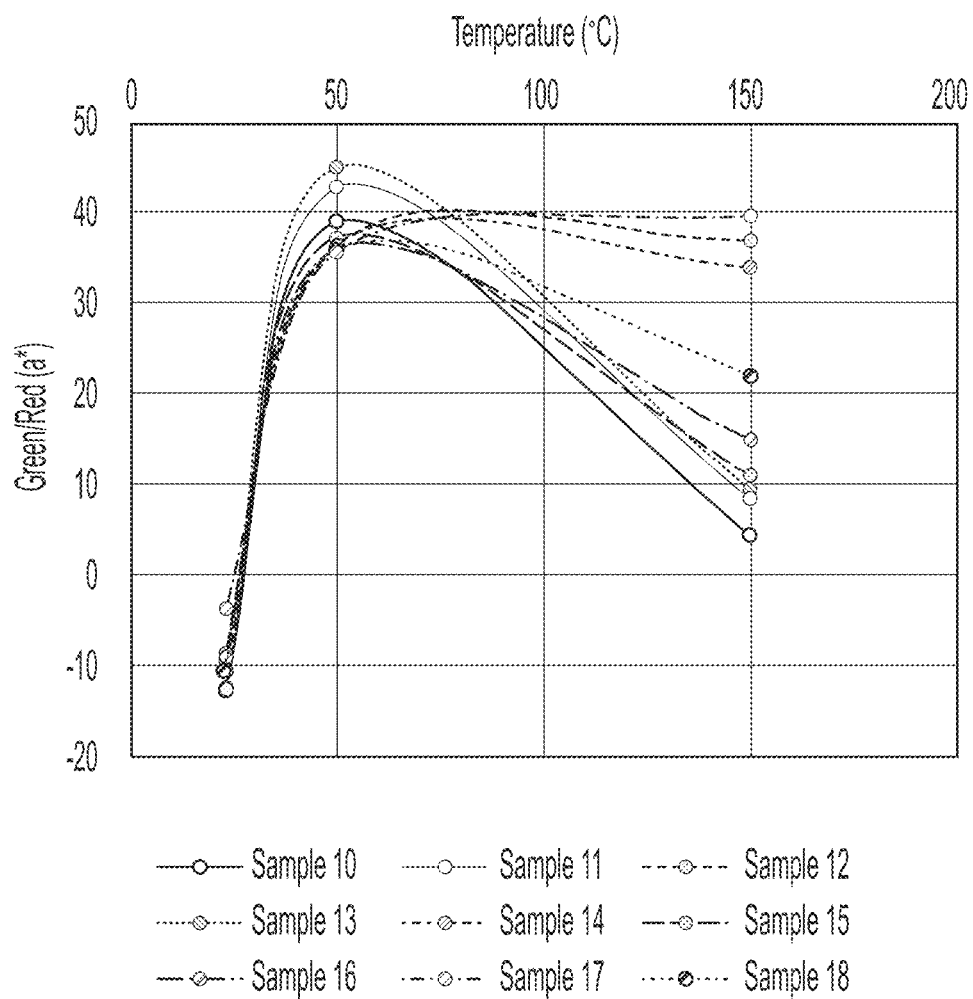
FIGS. 9 and 10 show plots of colorspace green/red value (a*) and colorspace blue/yellow value (b*), respectively, for Samples 10-18 as a function of heating temperature.
Figure 10:
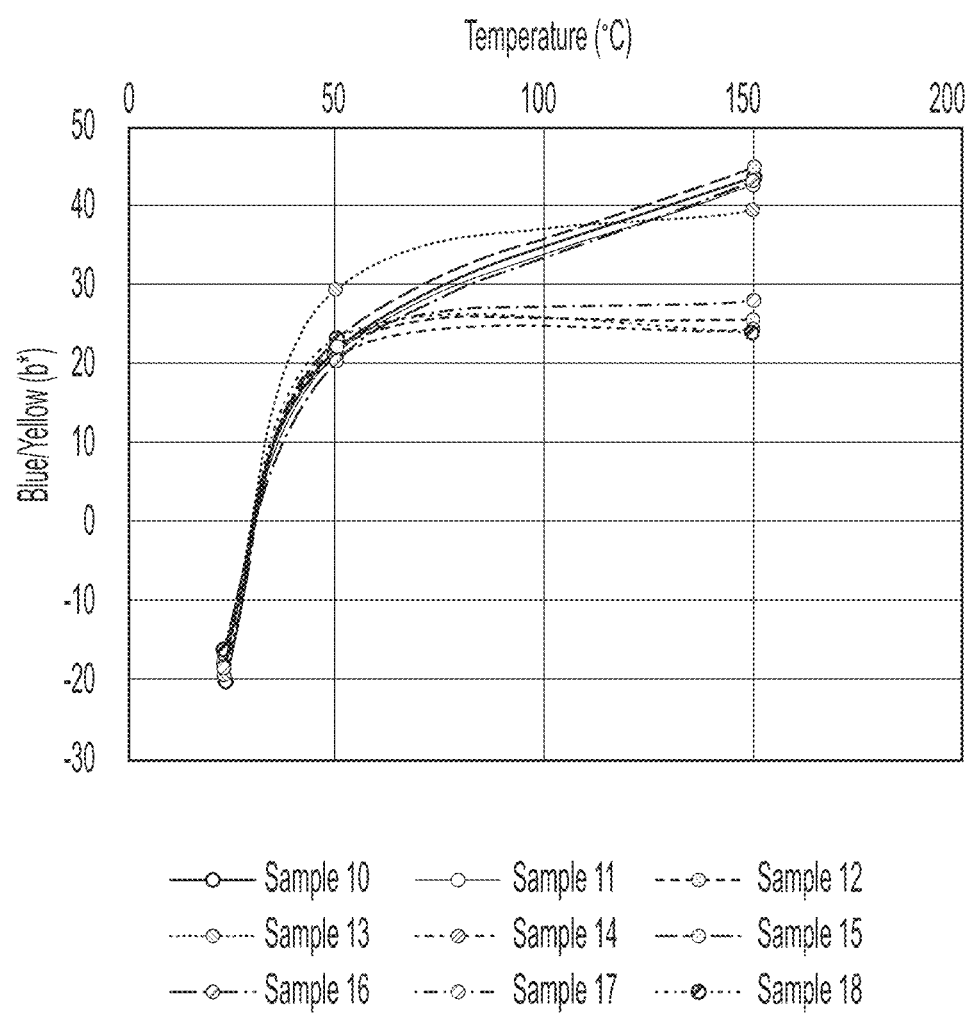

The effect of thermal activation upon Samples 10-18 is shown in FIGS. 8-10. FIG. 8 is a plot of colorspace lightness (L*) for Samples 10-18 as a function of heating temperature. As shown, initially blue samples (produced by UV irradiation) decreased somewhat in color brightness upon heating to 50° C. and 150° C. FIGS. 9 and 10 show plots of colorspace green/red value (a*) and colorspace blue/yellow value (b*), respectively, for Samples 10-18 as a function of heating temperature. As shown the colorspace green/red value peaked at 50° C. and decreased thereafter (FIG. 9), except for Samples 12, 14 and 18. The decrease in colorspace green/red values (a*) is consistent with the disappearance of the red to magenta color and formation of the yellow color upon further heating to 150° C. for all but Samples 12, 14 and 18. The limited change in a* for Samples 12, 14 and 18 is consistent with a lower degree of visible color change (FIG. 3B) for these samples upon heating to 150° C. Likewise, the colorspace blue/yellow values (b*) for all but Samples 12, 14 and 18 increased upon heating from 50° C. to 150° C., again consistent with ingrowth of the yellow color observed visually (FIG. 3B).

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A particulate composition comprising:
   a plurality of thermoplastic particulates comprising a thermoplastic polymer, and a color-changing material associated with the thermoplastic particulates, the color-changing material being both photochromic and thermochromic;
      wherein the thermoplastic particulates have an average particle size ranging from about 1 μm to about 1000 μm, and the color-changing material is incorporated upon an outer surface of the thermoplastic particulates after formation thereof.

2. The particulate composition of claim 1, wherein the color-changing material comprises one or more conjugated diynes.

3. The particulate composition of claim 1, further comprising:
   a plurality of nanoparticles disposed upon the outer surface of the thermoplastic particulates, the plurality of nanoparticles comprising a plurality of oxide nanoparticles;
      wherein the oxide nanoparticles have a size ranging from about 1 nm to about 100 nm.

4. The particulate composition of claim 3, wherein the plurality of oxide nanoparticles comprises a plurality of silica nanoparticles.

5. The particulate composition of claim 1, further comprising:
   a surfactant associated with the outer surface of the thermoplastic particulates.

6. A method comprising:
   providing a particulate composition comprising a plurality of thermoplastic particulates comprising a thermoplastic polymer, and a color-changing material associated with the thermoplastic particulates, the color-changing material being both photochromic and thermochromic;
      wherein the thermoplastic particulates have an average particle size ranging from about 1 μm to about 1000 μm, and the color-changing material is incorporated upon an outer surface of the thermoplastic particulates after formation thereof; and
   forming a printed object having a polymer matrix comprising the thermoplastic polymer and the color-changing material associated with the polymer matrix.

7. The method of claim 6, wherein forming the printed object comprises:
   depositing the particulate composition in a powder bed; and
   consolidating a portion of the thermoplastic particulates in the powder bed.

8. The method of claim 6, further comprising:
   exposing at least a portion of the printed object to first activation conditions sufficient to convert the color-changing material into a polymerized form of the color-changing material having a first coloration state.

9. The method of claim 8, wherein the first activation conditions comprise photoirradiation of the printed object.

10. The method of claim 9, further comprising:
    exposing at least a portion of the printed object to second activation conditions sufficient to convert the polymerized form of the color-changing material into a second coloration state different from the first coloration state.

11. The method of claim 10, wherein the second activation conditions comprise thermal treatment of the printed object.

12. The method of claim 6, wherein the color-changing material comprises one or more conjugated diynes.

13. The method of claim 6, wherein the plurality of thermoplastic particulates further comprises a plurality of nanoparticles disposed upon the outer surface of the thermoplastic particulates, the plurality of nanoparticles comprising a plurality of oxide nanoparticles;
    wherein the oxide nanoparticles have a size ranging from about 1 nm to about 100 nm.

14. The method of claim 13, wherein the plurality of oxide nanoparticles comprises a plurality of silica nanoparticles.

15. The particulate composition of claim 2, wherein the one or more conjugated diynes comprises at least one diyne carboxylic acid or a salt thereof.

16. The particulate composition of claim 15, wherein the at least one diyne carboxylic acid comprises 10,12-pentacosadiynoic acid.

17. The particulate composition of claim 4, wherein the silica nanoparticles are hydrophobically modified.

18. A particulate composition comprising:
    a plurality of thermoplastic particulates comprising a thermoplastic polymer, and a color-changing material associated with the thermoplastic particulates, the color-changing material being both photochromic and thermochromic;
       wherein the color-changing material is incorporated upon an outer surface of the thermoplastic particulates after formation thereof; and
    a plurality of silica nanoparticles disposed upon the outer surface of the thermoplastic particulates;
       wherein the silica nanoparticles have a size ranging from about 1 nm to about 100 nm.

19. The particulate composition of claim 18, wherein the color-changing material comprises one or more conjugated diynes.

* * * * *